(12) United States Patent
Rey

(10) Patent No.: US 7,958,242 B2
(45) Date of Patent: Jun. 7, 2011

(54) ESTABLISHMENT OF MEDIA SESSIONS WITH MEDIA ADAPTATION

(75) Inventor: Jose Luis Rey, Langen (DE)

(73) Assignee: Panasonic Corporation, Osaka (JP)

( * ) Notice: Subject to any disclaimer, the term of this patent is extended or adjusted under 35 U.S.C. 154(b) by 484 days.

(21) Appl. No.: 12/064,782

(22) PCT Filed: Aug. 10, 2006

(86) PCT No.: PCT/EP2006/007937
§ 371 (c)(1),
(2), (4) Date: Jun. 26, 2008

(87) PCT Pub. No.: WO2007/022875
PCT Pub. Date: Mar. 1, 2007

(65) Prior Publication Data
US 2009/0172170 A1    Jul. 2, 2009

(30) Foreign Application Priority Data
Aug. 26, 2005    (EP) .................................... 05018623

(51) Int. Cl.
*G06F 15/173* (2006.01)
(52) U.S. Cl. ........ 709/227; 709/206; 709/223; 709/230; 709/231; 709/237
(58) Field of Classification Search .................. 709/227, 709/246, 206, 223, 230, 231, 237
See application file for complete search history.

(56) References Cited

U.S. PATENT DOCUMENTS

| | | | |
|---|---|---|---|
| 6,888,821 B2 * | 5/2005 | Rasanen et al. ............... | 370/352 |
| 7,451,229 B2 * | 11/2008 | Klemets et al. ............... | 709/236 |
| 7,724,691 B2 * | 5/2010 | Mela et al. .................... | 370/261 |
| 7,791,748 B2 * | 9/2010 | Izumi et al. ................... | 358/1.15 |
| 2004/0015589 A1 | 1/2004 | Isozu | |
| 2005/0058093 A1 * | 3/2005 | Marques et al. .............. | 370/328 |
| 2005/0060411 A1 | 3/2005 | Coulombe | |
| 2005/0157660 A1 | 7/2005 | Mandato | |

FOREIGN PATENT DOCUMENTS

| | | |
|---|---|---|
| EP | 1 089 517 | 4/2001 |
| EP | 1 152 582 | 11/2001 |

(Continued)

OTHER PUBLICATIONS

International Search Report dated Nov. 3, 2006.

(Continued)

*Primary Examiner* — Liangche A Wang
(74) *Attorney, Agent, or Firm* — Dickinson Wright PLLC

(57) ABSTRACT

The present invention relates to a method and terminal for reporting media format adaptation resources to convert a media format of a media stream of a media session to be established between terminals through a packet switched communications network towards a requesting terminal. The invention further relates to a method and NSIS router for reporting media format adaptation resources for converting a media format of a media stream of a media session to be established between terminals. To allow terminals to establish a media session utilizing media adaptation, the invention provides a NSIS (Next Step In Signaling) based signaling framework facilitating the detection and reservation of media adaptation resources on (and off) a media data path on which media data are transported utilizing a media transport protocol among terminals participating in the session.

20 Claims, 14 Drawing Sheets

FOREIGN PATENT DOCUMENTS

| | | |
|---|---|---|
| JP | 2001-117809 | 4/2001 |
| JP | 2003-152820 | 5/2003 |

OTHER PUBLICATIONS

A. Eriksson et al., "A middlebox control plane framework for wireless and mobile ip networks," Mobile and Wireless Networking/High Performance Scientific, Engineering Computing Network Design and Architecture/Optical Networks Control and Management/AD HOC and Sensor Networks/Compile and Run Time Techniques for Parallel Computing ICPP 2004 Work, Aug. 2004, pp. 322-329.

A. Kassler, et al., "Generic QOS Aware Media Stream Transcoding and Adaptation," Internet Articla, 2003, pp. 1-10.

C. Niedermeier, et al., "MASA—A scalable QoS Framework," Internet Article, 2003, pp. 1-7.

E. Manner, et al., "NSLP for Quality of Service Signalling," IETF Standard-Working-Draft, Internet Engineering Task force, IETF, Ch, vol. nsis, No. 7, Jul. 2005.

English Translation of Japanese Notice of Rejection dated Jan. 18, 2011.

* cited by examiner

ESTABLISHMENT OF MEDIA SESSIONS WITH MEDIA ADAPTATION

FIELD OF THE INVENTION

The present invention relates to a method and terminal for reporting media format adaptation resources to convert a media format of a media stream of a media session to be established between terminals through a packet switched communications network towards a requesting terminal. The invention further relates to a method and NSIS router for reporting media format adaptation resources for converting a media format of a media stream of a media session to be established between terminals.

BACKGROUND ART

NSIS Framework

NSIS is the abbreviation for Next Steps in Signaling. It aims to define a modular approach for a signaling framework; consisting of a protocol for carrying signaling messages commonly referred to as the NSIS Transport Layer Protocol (NTLP) and a different protocol that has to be specified for each of the signaling applications commonly referred to as NSIS Signaling Layer Protocol (NSLP) (see RFC 4080, "Next Steps in Signaling (NSIS): Framework", incorporated herein by reference and available at http://www.ietf.org).

One example for an NTLP protocol is the GIMPS protocol specified in the internet draft "GIMPS: General Internet Messaging Protocol for Signaling" (draft-ietf-nsis-ntlp-07.txt) by Schulzrinne et al., incorporated herein by reference and available at http://www.ietf.org.

Examples of NSLP protocols are specified in the internet draft "NSLP for Quality-of-Service signaling" (draft-ietf-nsis-qos-nslp-07.txt) by Manner et al. or in the internet draft "NAT/Firewall NSIS Signaling Layer Protocol (NSLP)" (draft-ietf-nsis-nslp-natfw-07) by Stiemerling et al. (both documents incorporated herein by reference and available at http://www.ietf.org).

The NSIS QoS NSLP protocol takes on the long-standing problem of QoS reservation in the Internet, and extends it with NAT/FW traversal configuration signaling. Hence, as will become apparent from the following detailed description of the invention the QoS NSLP may be of particular relevance, if media delivery has to accommodate both network QoS capabilities (bandwidth, delay . . . ) as well as network-side processing (media adaptation) capabilities at the overlay nodes.

The NSLP data objects may be the payload of NTLP message, such as a GIMPS message. The basic structure of a GIMPS QUERY message is the following:

```
GIMPS-Query =   Common-Header
                Message-Routing-Information
                Session-Identification
                Network-Layer-Information
                Query-Cookie
                [ Stack-Proposal Stack-Configuration-Data ]
                [ NSLP-Data ]
```

An Typical Multimedia Scenario and its Shortcomings

In a typical multimedia scenario, as a first step, a signalling exchange is required to find out the capabilities (supported codecs, available links, available buffering capacity, etc.) of the communicating peers to participate in a session. Currently, for conversational scenario the Session Initiation Protocol (SIP) (see RFC 3261, "SIP: Session Initiation Protocol" incorporated herein by reference) is typically employed together with a capability exchange semantics for SDP as per Offer/Answer Model as specified in RFC 3264, "An Offer/Answer Model with the Session Description Protocol (SDP)" incorporated herein by reference. In the case of streaming services, the capability exchange may be done using RTSP (see RFC 2326, "Real Time Streaming Protocol (RTSP)" incorporated herein by reference) or SDP.

SIP is a query/response protocol that enables to negotiate the details of the multimedia session to be established as well as the exchange of end-host capability information. SDP is a protocol for expressing the parameters, number of flows and connections details of communicating peers. It also allows expressing capabilities and negotiating details of a session connection or codecs.

In the case that both communicating parties (end-hosts) have common capabilities, they can establish a multimedia session directly. If, however, there is a mismatch in the media capabilities of the end-hosts, a session is not established.

The session may typically not be established as the user requesting a service cannot communicate to the corresponding node (another user, a service provider, etc.) under which circumstances a session can be established or accepted. Even if there are media adaptation resources available in the network that may resolve a mismatch of in the format of media streams to be used in the session, a methodology for determining and describing the required media adaptation is missing, nor is there any procedural framework that enable search and reserve suitable media adaptation resources.

SUMMARY OF THE INVENTION

The object of the invention is to provide a signaling framework that allows terminals participating in a media session to utilizing media adaptation resources in case a mismatch in the terminals capabilities is detected.

The object of the invention is solved by the subject-matters of the independent claims. Advantageous embodiments are subject matter to the dependent claims.

One embodiment of the invention relates to the operation of a terminal to be participating in a media session. According to this embodiment, a method for establishing a media session comprising at least one media stream between a first terminal and a second terminal through a packet switched communications network is provided. In all embodiments of the invention, the at least one media stream is communicated using a media transport protocol.

The first terminal transmits a set-up message to the second terminal using a session management protocol to initiate the session. This set-up message may comprise a session description suggesting a media format [0] and, optionally, corresponding parameters and attributes for each media stream to be communicated in the media session.

The first terminal further receives a response to the set-up message using the session management protocol. This response may comprise an amended session description suggesting an alternative media format for at least one media stream of the media session for which a media format not supported by the second terminal has been suggested in the session description comprised in the set-up message transmitted by the first terminal.

The first terminal proceeds with determining for each alternative media format in the session description comprised in the response to the set-up message, if a respective alternative media format is supported by the first terminal. If this is not the case, i.e. not all alternative media formats suggested in the amended session description are supported by the first terminal, the first terminal detect for each alternative media format not supported by the first terminal at least one NSIS router using the Next Step In Signaling NSIS framework, wherein a (respective) detected NSIS router is capable of converting the packet data of a media stream from the media format suggested by the first terminal in the session description in the set-up message into the respective alternative media format suggested by the second terminal in the session description of the response in the set-up message.

If at least one NSIS router has been detected for each alternative media format not supported by the first terminal, the first terminal proceeds with reserving resources for converting packet data in the suggested media format into the respective alternative media format at least one NSIS router detected for a respective alternative media format not supported by the first terminal. Upon having successfully reserved the resources for media format conversion the media session is started. The packet data of the at least one media stream of the media session is provided using the media transport protocol from the first terminal to the second terminal through the at least one NSIS router on which resources for media format conversion have been reserved for each alternative media format not supported by the first terminal.

According to a further embodiment the detection of at least one NSIS router using the NSIS signaling framework may be implemented by the following mechanism. The first terminal transmits a query message using a NSIS Transport Level Protocol NTLP along the path of packet data of the at least one stream of the media session from the first terminal to the second terminal through the packet switched network. The message queries each NSIS router receiving the query message for a capability to convert packet data of a stream of the media session from a suggested media format not supported by the first terminal to a respective alternative media format suggested by the second terminal in the session description in the response to the set-up message. In response to the query message the first terminal receives a response message using the NSIS Transport Level Protocol NTLP indicating at least one NSIS router on the path of packet data from the first terminal to the second terminal capable of converting packet data of a stream of the media session from a suggested media format into the respective alternative media format. If no NSIS router is capable of providing the queried media format conversion, no NSIS router is indicated in the response message.

In a further variation, the query message also queries each NSIS router receiving the query message for the capability to convert packet data of a media stream of the media session from a suggested media format not supported by the first terminal into an intermediate media format or from the intermediate media format into another intermediate media format or into the respective alternative media format for the respective media stream of the media session. Hence, not only a direct conversion of media data from the suggested media format to the alternative media format not supported by the first terminal may be queried, but also adaptation resources that when appropriately "combined" may result in a conversion of media data from the suggested media format to the alternative media format not supported by the first terminal.

Accordingly, the response message further may indicate whether at least one NSIS router on the path from the first terminal to the second terminal is capable of converting packet data of a media stream of the media session from a suggested media format into an intermediate media format or from the intermediate media format into another intermediate media format or into the respective alternative media format.

According to a further embodiment, the reservation of resources for converting packet data at a NSIS router may be performed as follows. The first terminal transmits a resource reservation request message to at least one NSIS router using the NSIS Transport Level Protocol NTLP requesting the reservation of media adaptation resources for converting the packet data of a stream of the media session from a suggested media format to an alternative media format suggested by the session description in the response to the set-up message by the second terminal. In response thereto the first terminal receives in a response message using the NSIS Transport Level Protocol NTLP indicating whether the NSIS router has reserved resources for the conversion.

In a further embodiment of the invention the session description comprised the set-up message further indicates whether the first terminal is willing to perform media format conversion for at least media stream of the media session, if the second terminal does not support a suggested media format of a media stream in the session description.

In another embodiment of the invention the session description transmitted comprised in the set-up message further indicates to the second terminal and whether the reception of a respective media stream of the media session is mandatory for the establishment of the media session.

In a variation of this embodiment the session description transmitted comprised in the set-up message further indicates whether a conversion of a suggested media format for a media stream of the media session into another media format is optional or mandatory for the establishment of the media session, in case the second terminal does not support the suggested media format.

Moreover in another embodiment of the invention the amended session description indicates whether the second terminal is willing to detect and reserve resources on at least one NSIS router media for converting packet data of a media stream in an alternative media format into packet data of the media stream in a suggested media format, if the suggested format for the respective media stream is not supported by the second terminal. If so, the amended session description also indicates that the second terminal has started detection and reservation media format conversion resources upon transmitting the response to the set-up message.

According to another embodiment of the invention the service descriptions transmitted and received by the first terminal may comprise quality of service constraints relating to the session, and wherein the amended session description in the response to the set-up message comprises suggests alternative quality of service constraints to the quality of service constraints comprised in the session description of the set-up message.

In the latter case, another embodiment of the invention suggests that the first terminal determines whether the alternative quality of service (QoS) constraints are acceptable for the user of the first terminal. If this is the case, the first terminal may reserve resources along a path from the first terminal to the second terminal through the packet switched communications network according to alternative quality of service constraints indicated in the session description of the second terminal, wherein the packet data of the at least one media stream of the media session is passed from the first terminal to the second terminal along said path.

In another embodiment of the invention, the media session is aborted, if no NSIS router is detected for each alternative media format suggested in the session description received in the response to set-up message, if not sufficient resources for the converting media format at a respective NSIS router can be reserved, or if not sufficient resources along the path through the packet switched communications network can be reserved for fulfilling the alternative quality of service constraints suggested in the session description received in the response to set-up message.

According to another embodiment of the invention starting the media session may comprise the steps of transmitting by the first terminal an update message to the second terminal comprising an updated session description describing the media format conversion in an adaptation node for each respective stream of the media session for which an alternative media format has been suggested along a path from the first terminal to the second terminal through the packet switched communications network. The packet data of the at least one media stream of the media session is passed from the first terminal to the second terminal along said path.

In a variation of this embodiment, the transmitted update message further comprises information on resources reserved by the first terminal along the path from the first terminal to the second terminal.

According to a further variation, the first terminal may receive an update message from the second terminal comprising an updated session description describing the media format conversion in an adaptation node for each respective stream of the media session for which an alternative media format has been suggested along a path from the second terminal to the first terminal through the packet switched communications network, wherein the packet data of at least one media stream of the media session is passed from the second terminal to the first terminal along said path.

In an even further variation of the embodiment, the received update message further comprises information on resources reserved by the first terminal along the path from the second terminal to the first terminal.

The media transport protocol may for example be the Real-time Transport Protocol RTP, while the session description is provided in the Session Description Protocol SDP format or the Real-Time Streaming Protocol RTSP format.

According to another embodiment of the invention the session management protocol is the Session Initiation Protocol SIP, and the set-up message is an Invite message of the SIP protocol. Accordingly, the response to the set-up message is a Session Progress message of the SIP protocol indicating to the first terminal that the second terminal acknowledges the willingness of the first terminal to detect and reserve media format conversion resources and that the second terminal has started to detect and reserve resources for media format conversion at least NSIS router for converting a media stream of the media session in an alternative media format not supported by the first terminal into a respective suggested media format supported by the first terminal.

If the alternative media format suggested in the session description comprised in the Session Progress message is not supported by the first terminal, the first terminal may transmit a Provisional Response Acknowledgement message indicating to the second terminal that the first terminal has started to detect and reserve resources for media format conversion at a NSIS router for each alternative media format suggested in the session description, wherein an adaptation node detected and on which resources for media format conversion are reserved by the second terminal is configured to convert the packet data of a media stream of the media session from the alternative media format into the media format suggested by the first terminal. Moreover, the first terminal may receive an provisional response acknowledgement in response this Provisional Response Acknowledgement message.

Another aspect of the invention is the operation NSIS routers supporting the detection of media adaptation resources. According to another embodiment of the invention a method for reporting media format adaptation resources for converting a media format of a media stream of a media session to be established between terminals through a packet switched communications network towards a requesting terminal is provided. The method steps performed by an NSIS router on a media data path on which packet data of the media stream of the session encapsulated by a media transport protocol are transported through the packet switched network from a requesting terminal to a destination terminal participating in the media session to be established: A query message may be received by the on-path NSIS router using a NSIS Transport Level Protocol NTLP through the packet switched network. The query message queries the NSIS router receiving the query message for a capability to convert packet data of a stream of the media session from a first media format to a second, different media format.

In response to the received query message, the on-path NSIS router transmits a response message towards the requesting terminal using the NSIS Transport Level Protocol NTLP indicating whether the NSIS router has the capability of converting packet data of the stream of the media session from a first media format into the second media format.

It should be noted that depending on the location of the on-path NSIS router on the media data path the query message may be received from the querying terminal directly, form its proxy providing NTLP functionality to the querying terminal or an adjacent NSIS router. Accordingly the response message is returned to the respective entity from which the query message has been received.

In a variation of the embodiment, the query message further queries for the capability to convert packet data of the media stream of the media session from the first media format into an intermediate media format or from the intermediate media format into another intermediate media format or into the second alternative media format. Accordingly, the response message further indicates whether the NSIS router is capable of providing at least one of the queried media format conversions.

In a further embodiment of the invention, the query message comprises a media format adaptation description indicating one or more media format conversions for which adaptation capabilities are queried.

In another embodiment of the invention, the on-path NSIS router may receive a resource reservation request message using the NSIS Transport Level Protocol NTLP, wherein this message comprises a description of a media format conversion to be performed by the NSIS router and for which resources are requested to be allocated. The on-path NSIS router may determine whether resources for the media format conversion indicated by the description can be allocated at the NSIS router and if so, reserves the resources for the conversion. Accordingly, the response message transmitted by the on-path NSIS router indicates whether the NSIS router has (successfully) reserved resources for the conversion.

In another embodiment of the invention, the on-path NSIS router may receive a resource reservation request message using NTLP comprising a description of a media format conversion to be reserved at another NSIS router located on the media data path. The NSIS router processing the resource reservation request message establishes a tunnel to the other NSIS router located on the media data path and upon start of the media session, forwards packet data of the media stream to be converted to NSIS router located on the media data path for conversion.

In a further embodiment of the invention, the on-path NSIS router receives a resource reservation request message using NSIS Transport Level Protocol NTLP comprising a description of a media format conversion to be reserved at an NSIS router not located on the media data path. The on-path NSIS router forwards the resource reservation request message to the NSIS router not located on the media data path (off-path NSIS router) and establishes a tunnel to the off-path NSIS router. Upon start of the media session, the on-path NSIS router forwards packet data of the media stream to be converted to off-path NSIS router for conversion.

According to another embodiment of the invention the on-path NSIS router adds a description of the media format adaptation capabilities available at the NSIS router to the query message, and forwards the received query message including the added description to the next NSIS router the media data path or the destination terminal. In response to the forwarded query message the on-path NSIS router may receive a response message from the next NSIS router on a media data path or the destination terminal. In case queried media format adaptation capabilities are available, the response message comprises at least one description of media format adaptation capabilities available at NSIS routers located on the media data path. Moreover, in case queried media format adaptation capabilities are available, the response message transmitted comprises the at least one description of media format adaptation capabilities available at NSIS routers located on the media data path.

In a variation of the embodiment, the on-path NSIS router also forwards the query message to at least one NSIS router not located on the media data path, and receives from the at least one NSIS router not located on the media data path a response message comprising a description of media data adaptation capabilities available at the at least one NSIS router not located on the media path.

In a further variation, the on-path NSIS route adds the description of media data adaptation capabilities available at the at least one NSIS router not located on the media path to said received query message prior to forwarding the received query message to the next NSIS router on a media data path.

In another embodiment of the invention the response message transmitted towards the requesting terminal further comprises the description of media data adaptation capabilities available at the at least one NSIS router located or not located on the media path.

According to another embodiment of the invention a terminal for establishing a media session comprising at least one media stream between the terminal and a second terminal through a packet switched communications network is provided. The terminal comprises a transmitter for transmitting a set-up message to the second terminal using a session management protocol to initiate the session, wherein the message comprises a session description suggesting a media format and corresponding parameters and attributes for each media stream to be communicated in the media session. The terminal also comprises a receiver for receiving a response to the set-up message using the session management protocol, wherein the response to the set-up message comprises a amended session description, wherein the amended session description suggests an alternative media format for at least one media stream of the media session for which a media format not supported by the second terminal has been suggested in the session description comprised in the set-up message.

The terminal includes a processing unit for determining, if a respective alternative media format is supported by the terminal for each alternative media format in the session description comprised in the response to the set-up message. The processing unit is further configured to detect for each alternative media format at least one NSIS router using the Next Step In Signaling NSIS framework, if a respective alternative media format is not supported by the terminal. Thereby, a detected NSIS router is capable of converting the packet data of a media stream from the media format suggested by the first terminal in the session description in the set-up message into the respective alternative media format suggested by the second terminal in the session description of the response in the set-up message.

Moreover, the terminal comprises a reservation unit for reserving resources for converting packet data in the suggested media format into the respective alternative media format at least one NSIS router detected for a respective alternative media format not supported by the first terminal, if at least one NSIS router has been detected for each alternative media format not supported by the first terminal. Further, the terminal is adapted to start the media session upon having successfully reserved the resources for media format conversion and to provide the packet data of the at least one media stream of the media session using the media transport protocol from the terminal to the second terminal through the at least one NSIS router on which resources for media format conversion have been reserved for each alternative media format not supported by the terminal.

Another embodiment of the invention provides a terminal comprising means adapted to perform the method for establishing a media session according to one of the various embodiments and variations above.

A further embodiment provides a NSIS router for reporting media format adaptation resources for converting a media format of a media stream of a media session to be established between terminals through a packet switched communications network towards a requesting terminal. The NSIS router (on-path NSIS router) is located on a media data path on which packet data of the media stream of the session encapsulated by a media transport protocol are transported through the packet switched network from a requesting terminal to a destination terminal participating in the media session to be established. The NSIS router comprises a receiver for receiving a query message using NTLP through the packet switched network, wherein the query message queries the NSIS router receiving the query message for a capability to convert packet data of a stream of the media session from a first media format to a second, different media format.

The on-path NSIS router also comprises a transmitter transmitting a response message towards the requesting terminal using the NSIS Transport Level Protocol NTLP in response to the received query message, wherein the response message indicates whether the NSIS router has the capability of converting packet data of the stream of the media session from a first media format into the second media format.

Another embodiment provides an NSIS router comprising means adapted to perform the method for reporting media format adaptation resources according to one of the various embodiments and variations thereof above.

Moreover, another embodiment of the invention provides a computer readable medium storing instructions that, when executed by the processor of the terminal, cause the terminal to perform the steps of the method for establishing a media session according to one of the various embodiments and variations thereof above.

Another embodiment of the invention is related to a computer readable medium storing instruction that, when executed by the processor of an on-path NSIS router, cause the on-path NSIS router to perform the method for reporting media format adaptation resources according to one of the various embodiments and variations above.

BRIEF DESCRIPTION OF THE FIGURES

In the following the invention is described in more detail in reference to the attached figures and drawings. Similar or corresponding details in the figures are marked with the same reference numerals.

DETAILED DESCRIPTION

For a better understanding of the invention some terms frequently used in this document are specified first.

An endpoint denote a user or user agent that issues (or serves) a request for a particular service. Servers and clients may be endpoints. Endpoints may also be user agents and proxy instances, i.e. software entities that act on behalf of the user and are aware of his/her service request details, capabilities and preferences. One example of an endpoint is a SIP user agent.

An NSIS router or proxy denotes a network node that has the possibility to perform packet processing in addition to providing routing capabilities. The packet processing may for example be transcoding, metering, buffering, splitting or synchronizing media data flows. The packet processing resources also referred to as media (format) adaptation resources may not necessarily be located at the NSIS router, but can be accessed through it. NSIS routers may be also co-located with network nodes that are aware of the QoS underlying infrastructure, i.e. ingress points to the QoS technology domain: DiffServ ingress routers, MPLS Label Egress Routers and the like. Since the proposed solution uses NSIS signaling framework for reservation of the required media adaptation resources, an NSIS router or proxy is NSIS-enabled.

An overlay network is formed by set of NSIS routers (and proxies) that form part of the same virtual topology. The topology is virtual in the sense that it abstracts from the underlying routing. Typically, nodes in the overlay network are not aware of the underlying routing, like OSPF or RIP routing.

Figure 1:
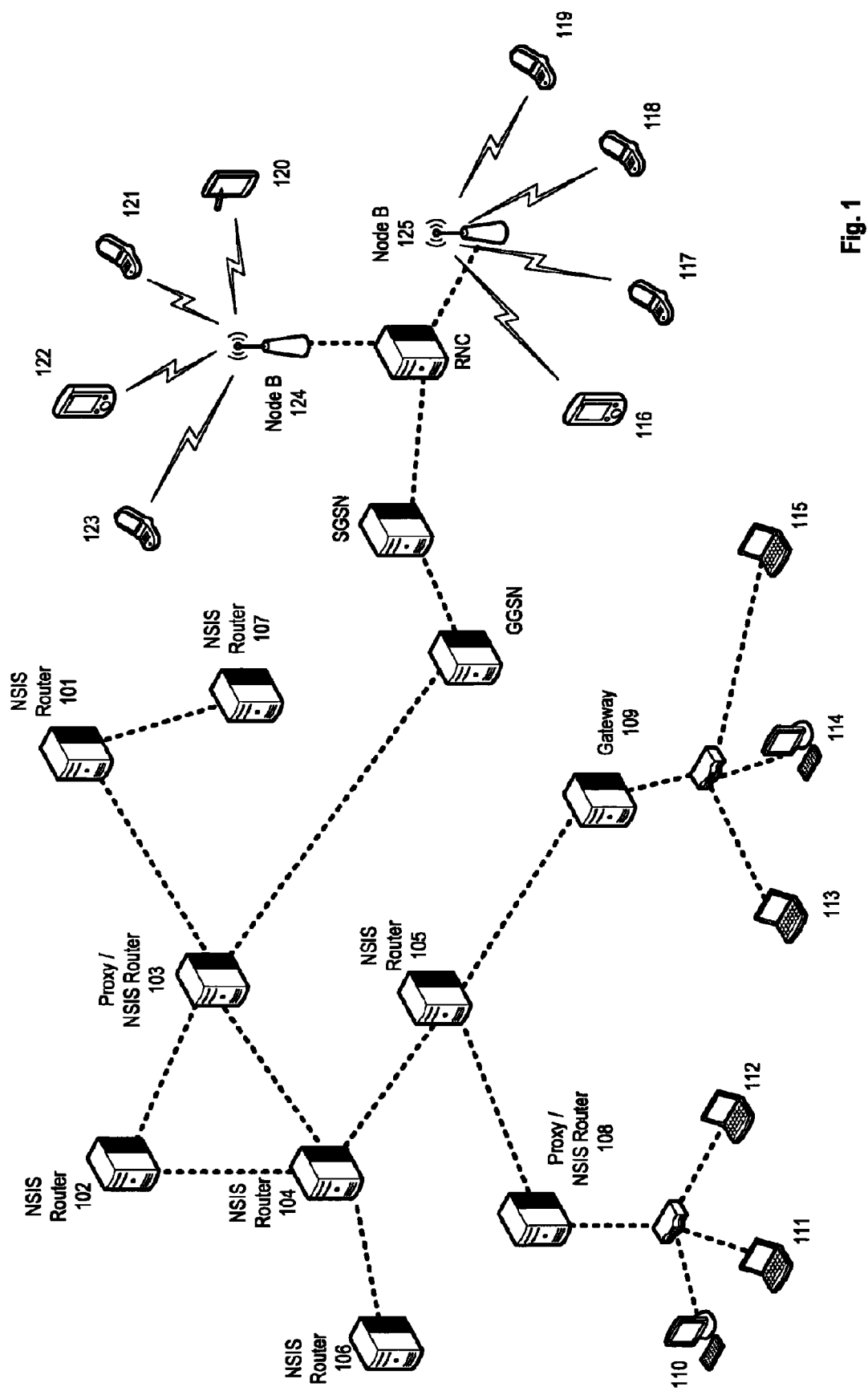
FIG. 1 shows an overview of a packet switched network based on which exemplary embodiments of the invention will be explained.
Figure 2:
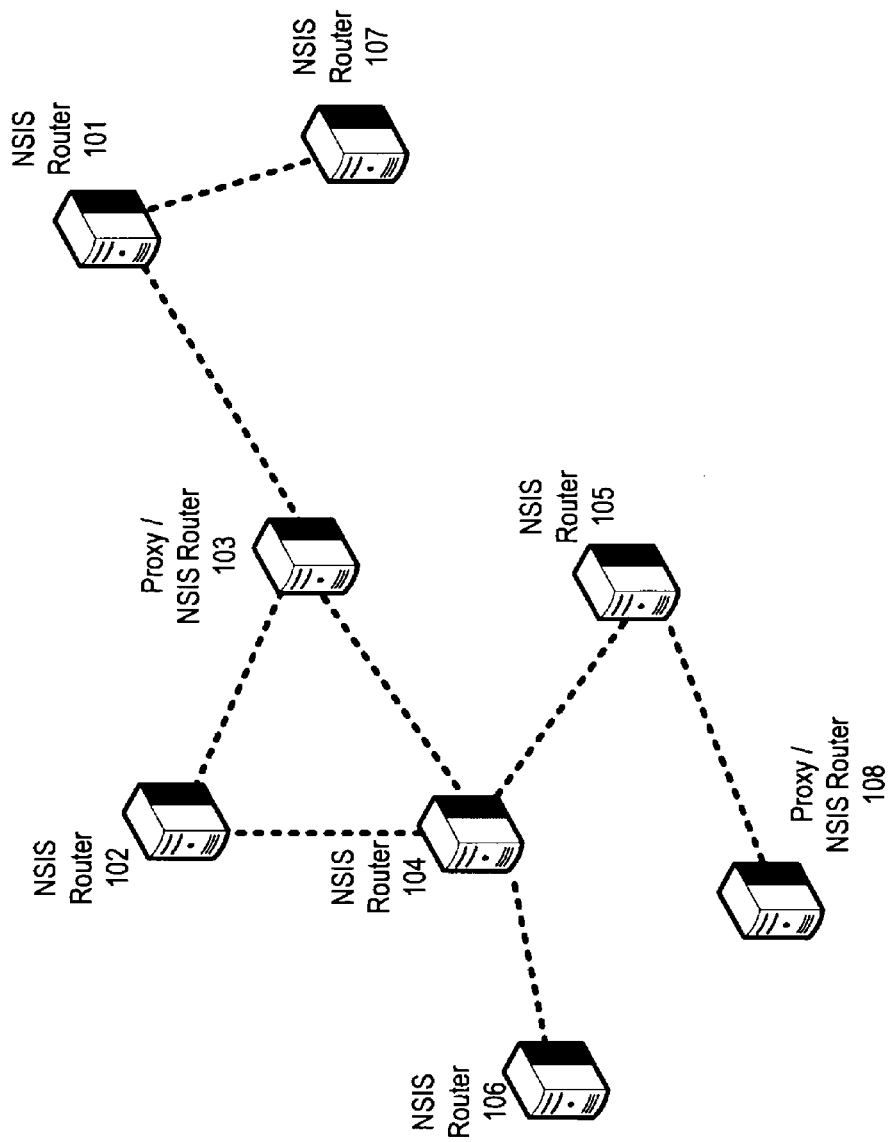
FIG. 2 shows an overlay network to the packet switched network of FIG. 1 comprising NSIS enabled routers and NSIS proxies.

FIG. 1 shows an overview of a packet switched network based on which exemplary embodiments of the invention will be explained in the following. For illustrative purposes only NSIS enabled routers that understand the signaling extensions defined herein 103-108, so-called NSIS routers, are illustrated in the core part of the network. However, it is apparent that there may be further routers or network nodes in between two adjacent NSIS routers that do not implement NSIS functionality of interest here. Hence, on the NSIS protocol level, the network "seen" by the NSIS routers 103-108 is similar to the overlay network shown in FIG. 2 from which it can be recognized that routers not implementing NSIS are transparent to the NSIS routers on the NSIS protocol level.

NSIS Router 108 also serves as a proxy for the terminals 110-112 which are connected to NSIS Router 108. The same applies to NSIS Router 103 which acts as a proxy server for the wireless terminals 116-123 in a mobile communication network. In the example shown in FIG. 1 the mobile communication network is an UMTS network. The terminals 116-123 (denoted User Equipment UE in the UMTS terminology) are connected to their Node Bs 124 or 125 through an air interface. The Node Bs 124, 125 and the attached Radio Network Controller RNC form a so-called Radio Access Network RAN of the UMTS network. The RNC is coupled through a Serving GPRS Support Node SGSN and a Gateway GPRS Support Node GGSN to NSIS Routers 103 and 107 of the packet switched network. Again, on the NSIS protocol level, the intermediate nodes in the mobile communication network (GGSN, SGSN, RNC, Node Bs) implement lower protocol layer of OSI reference model providing inter alia transport and addressing functionality, while the higher layers like the NSIS protocol layer are transparent to the intermediate nodes.

In general terminals may be of any kind of fixed or wireless terminals, such as desktop computer, laptops, PDAs, mobile phones, tablet PCs, etc., that are provided with sufficient capabilities to establish and participate in a media session. For example, the terminals may be equipped with transceivers for communicating with NSIS routers/proxies (such as NSIS Router 103 or 108), other nodes of the packet switched network or communication partners when establishing a media session. A media service may include for example multicast or broadcast media streaming, end-to-end orientated conversational media services like Voice-over-IP (VoIP) communication, video-conferencing, or streaming services like video/audio streaming, etc.

Figure 3:
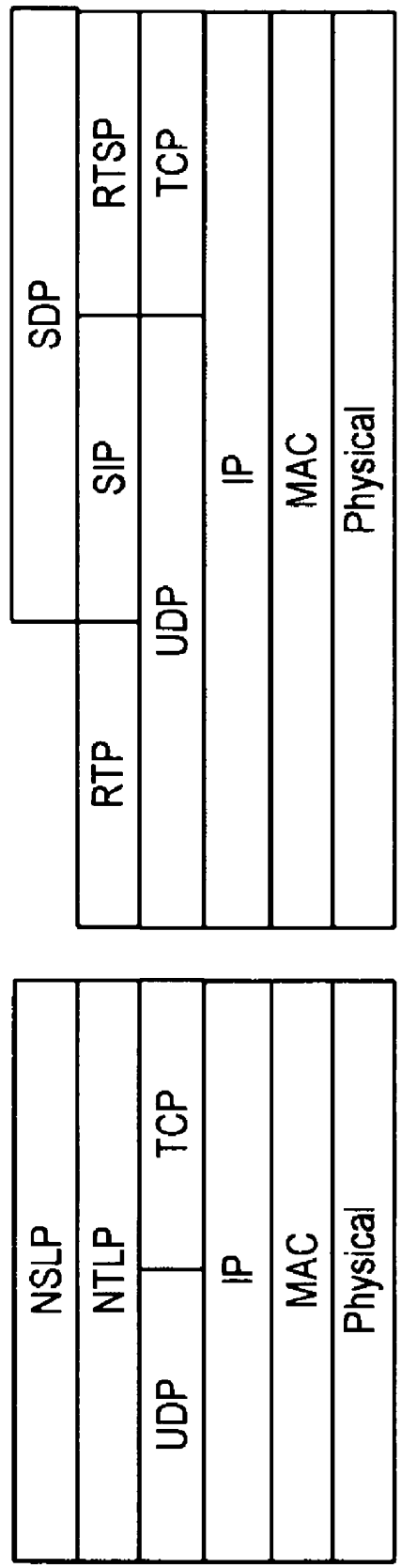
FIG. 3 shows exemplary protocol stacks that may be employed for providing an end-to-end media session in the packet switched network of FIG. 1.

FIG. 3 shows exemplary protocol stacks that may be employed for providing an end-to-end media session in the packet switched network of FIG. 1.

In general, the media data of the media session is provided in one or more media streams. The media data is transported in packetized form employing a media transport protocol. For example, the Real-time Transport Protocol RTP may be used as a media transport protocol. For session initiation and management a session management protocol may be used. For example, a suitable choice of a session management protocol is the Session Initiation Protocol SIP. As an alternative for SIP also the Real-Time Streaming Protocol RTSP may be utilized. Typically, RTSP is employed for multimedia server to client services and it is transported in connection-orientated communication fashion via the TCP protocol, while SIP messages via the connectionless UDP protocol. Also RTP is commonly provided via UDP on the Transport Layer, however also the use of TCP is possible. The session management protocol conveys a description of the session, the so-called session description. For this purpose, protocols like the Session Description Protocol SDP may be utilized. SDP data may be for example conveyed encapsulated in SIP protocol messages.

Besides session initiation and management, media data transport and session description the NSIS framework is employed to implement the enhanced functions according to different embodiments of the invention.

The NSIS signaling framework may be separated in two protocols: a signaling application layer commonly referred to as the NSIS Signaling Layer Protocol (NSLP) and the underlying transport mechanism for NSLP data, the NSIS Transport Level Protocol (NTLP). In the NTLP layer the General Internet Messaging Protocol for Signaling (GIMPS) may be employed to encapsulate the NSLP data. The NSLP data encapsulated in the NTLP layer may be provided via a UPD or TCP connection in the transport layer.

As will be explained in further detail below, one aspect of the invention is the implementation of a new Media Adaption NSLP protocol which allows involving media format adaptation nodes corresponding to NSIS routers with enhanced functionality in the media session in order to overcome incompatibilities in media formats of media codecs used in a media session. Further, the Media Adaption NSLP protocol allows detecting suitable media format adaptation nodes and resource reservation at media format adaptation nodes.

In FIG. 3, the Network and Link Layer (Layer 3 and 2) is exemplified by the IP protocol for addressing and the MAC protocol. However, the implementation of the Network and Link Layer protocols depends on the network infrastructure used in the network or different parts thereof.

Figure 4:
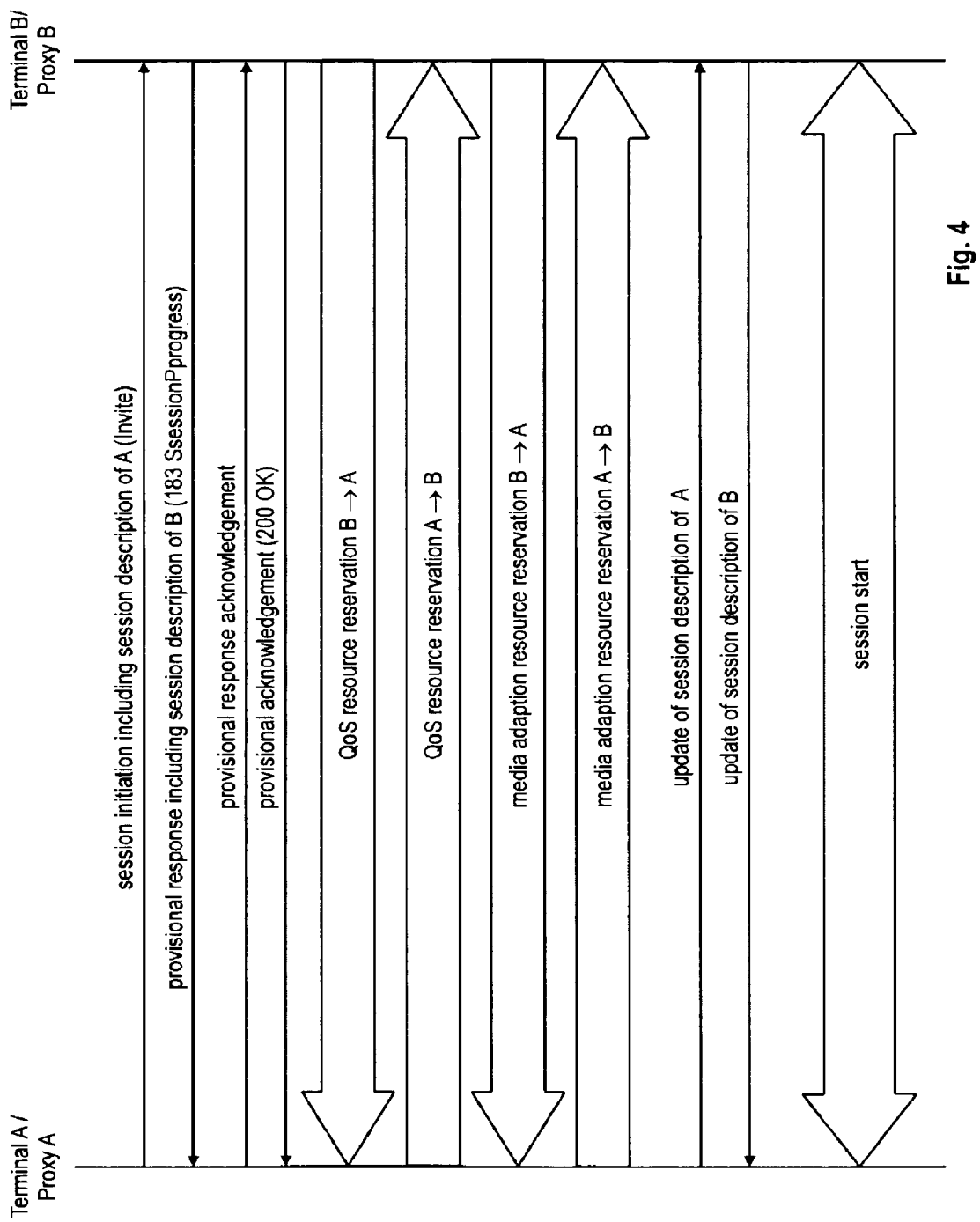
FIG. 4 shows an exemplary establishment of a media session between two terminals according to an embodiment of the invention.

FIG. 4 shows an exemplary establishment of a media session between two terminals according to an embodiment of the invention. Based on FIG. 4 some of the main aspects of the invention will be discussed in further detail in the following.

A terminal A (Endpoint A) which may utilize a proxy A first initiates a media session to another terminal Node B (Endpoint B) which may also utilize a proxy B. The set-up message transmitted from the terminal A to terminal B is transported using a session management protocol comprises a session description. The session description comprised in the set-up message describes the media session by identifying a media format, parameters and attributes for each media stream to be conveyed in the session. Each of the streams may be a unidirectional or bidirectional stream. Bidirectional in this context means that two streams are provided from terminal A to terminal B and terminal B to terminal A, respectively, in a common media formal, while unidirectional means that a single stream is provided from terminal A to terminal B or terminal B to terminal A in a the described media format. For example, a video-conferencing session may consist of a bidirectional audio stream in PCM format and a bidirectional video stream in MPEG format. In a variation of this embodiment, an enhanced SDP protocol is used to describe the contents of the media session to be established.

The parameters and attributes of the session description may optionally include QoS requirements for the media session, for example for each individual stream of the session. Further, the attributes and parameters may also indicate that a stream of the media session is optional or mandatory for the session.

Moreover, the parameters and attributes may also indicate to terminal B that terminal A agrees to accept changes to its proposed session description, e.g. the use of different QoS requirements, changes of the media format (e.g. display size of the format, codec, bit-rate, frame-rate, etc.) suggested for individual media streams, etc. Hence, the parameters and attributes in the session description may signal to terminal B that terminal A also agrees to the use of media format adaptation nodes, if an incompatibility in media formats may not be resolved using the available resources available at the terminals A and B.

Terminal B receives the set-up message and evaluates the session description. In this evaluation procedure, terminal B determines whether sufficient capacities are available at the terminal to establish the media session. For example, if a video stream should be comprised in the media session, but terminal B has no adequate codec for encoding and/or decoding video data in the media format suggested by terminal A in the session description or if there is for example no adequate display size available, terminal B may decide to change the session description such that it may be established.

In response to the set-up message, terminal B sends a provisional acknowledgement back to terminal A in which it includes the amended session description in order to make terminal A aware of the changes terminal B proposes for the session.

For example, terminal A wants to establish a video conferencing session and suggests the use of a bidirectional MPEG video stream at a size of 640×400 pixels. However, terminal B is equipped with a display size of 320×200 pixels only and may only decode and encode in DivX video format. If terminal B is equipped with resources allowing converting the display size locally and to encode the video in the suggested size of 640×400 pixels, the suggestion of the size of 640×400 pixels for the video may be acceptable for terminal B. If no adequate resources are available, terminal B may amend the session description such that it indicates that it proposes to use a DivX encoded video at 320×200 pixels.

Upon reception of the response from terminal B, terminal A recognizes the changes to the session description and may determine, whether the new description is acceptable in terms of available resources and/or the possibility to use media format adaptation for the session.

Returning to the example, if terminal A has also a DivX encoder that can produce and decode a video stream in 320× 200 pixel format, it may indicate to terminal B in a provisional acknowledgement message that the amendments to the session description are acceptable. If no DivX codec is available at terminal A, but the use of media format adaption nodes for the session is accepted by terminal A, it may signal a provisional acknowledgement to terminal B. This provisional acknowledgement may indicate to terminal B that under the precondition that media format adaptation in the network is possible on both paths on which packets transporting the video stream are passed from terminal A to terminal B and terminal B to terminal A, respectively, the media session can be started.

It is important to recognize that the transport of the packets conveying the data of the respective media streams of the media session utilizing the media transport protocol may be routed on different paths in either direction from terminal A to terminal B and from terminal B to terminal A, respectively, due to the packet switched nature of the network. Hence, in case it may not be ensured that the packet data of the video session are passed via a single path in both directions between terminal A and terminal B, media format adaptation capabilities need to be detected on either path from terminal A to B and terminal B to A independently, if bidirectional streams are concerned.

In case QoS constraints have to be met as a precondition for establishing the media session, network resources may be reserved along either path for transporting the media data utilizing the media transport protocol at the given QoS constraints (e.g. guaranteed latency, guaranteed minimum bandwidth, etc.). In a variation of this embodiment, the QoS-NSLP protocol of the NSIS signaling framework is utilized for this purpose.

The detection and reservation of media format conversion capabilities along the paths according to different embodiments of the invention will be explained in further detail below referring to FIGS. 5 through 13. In brief the mechanism utilizes the NSIS signaling framework by providing a new Media Adaptation-NSLP for detecting NSIS routers which may interface and utilize with media adaptation resources that may resolve the mismatch of media formats for the session, e.g. by transcoding/conversion and which allows reserving resources of the media adaptation capabilities on these NSIS routers. Returning to the example, terminal A may query the NSIS routers in the NSIS overlay network for NSIS routers which interface a video transcoder allowing to convert (transcode) the MPEG video at 640×400 pixels to a DivX video at 320×200 pixels.

In response to this query terminal A receives information identifying the NSIS routers which may provide the desired media format adaptation functionality. Next, terminal A reserves resources for media adaptation at the identified NSIS router.

A similar procedure is performed by terminal B to detect and reserve media adaptation resources along a path from terminal B to terminal A through the packet switched network. In the example, terminal B may thus query the NSIS routers in the NSIS overlay network for NSIS routers which interface a video transcoder allowing to convert (transcode) the a DivX video at 320×200 pixels to a MPEG video at 640×400 pixels.

Upon having successfully reserved the media adaptation resources in the network, terminal A may inform terminal B by sending a message including an updated session description. The updated session indicates to terminal B that terminal A has been able to find NSIS router that provide the desired media format conversion and that it has been able to reserve resources thereon. Optionally, in case QoS constraints are to be met, the message may also indicate the QoS constraints that could be reserved by terminal A in the network. Terminal B responds to the message by sending a further message including a further updated session description which "corrects" the session description to reflect the media adaptation resources reserved by terminal B and, optionally, the QoS resources reserved in the network.

If the session according to the updated session descriptions are acceptable for terminal A and terminal B, the media session is started. If for example, no media format adaption is allowed according to the policies of either terminal A or B, no media adaptation resources are detected or may not be reserved, the establishment of the session may be aborted.

Figure 5:
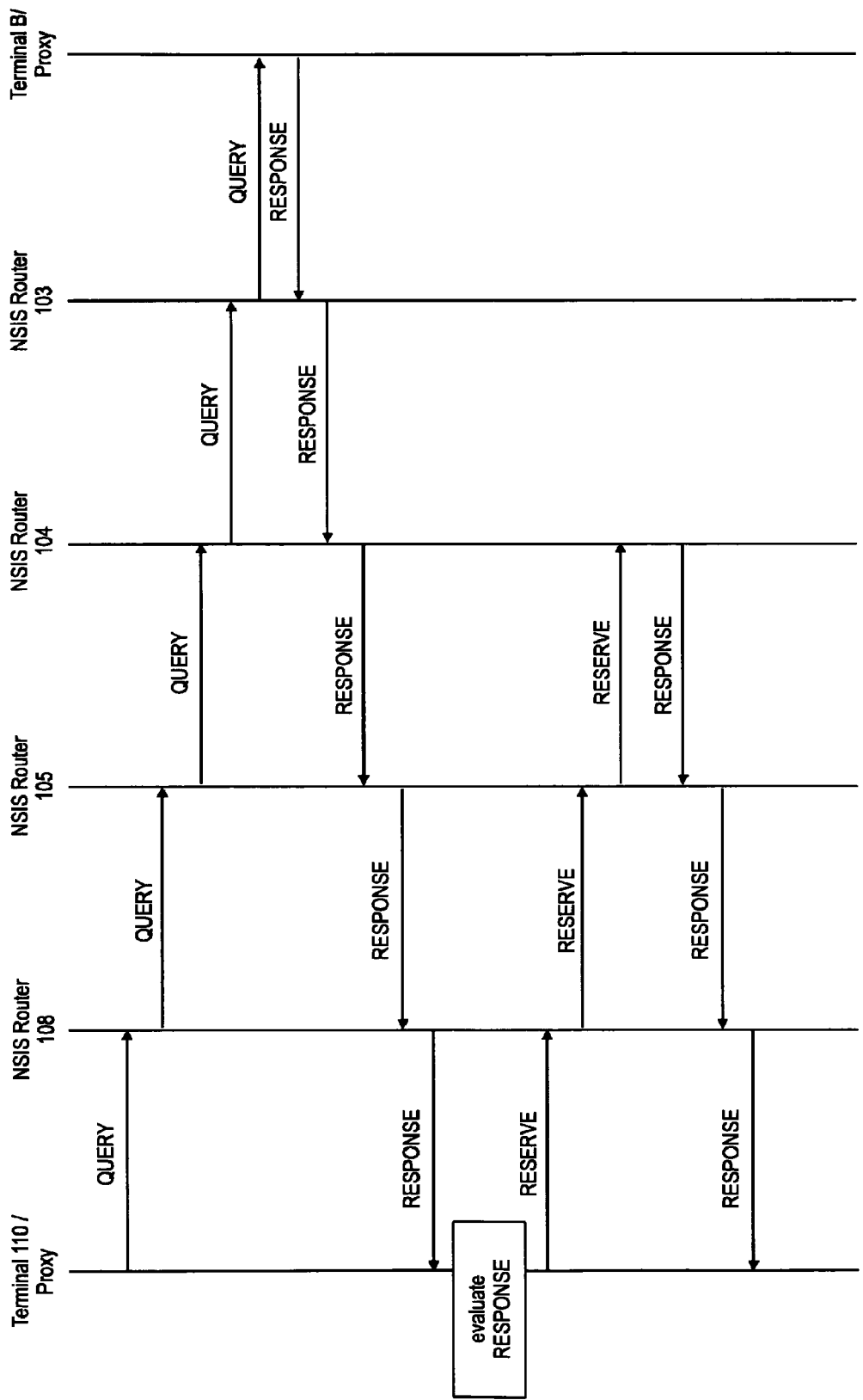
FIG. 5 shows an on-path NSIS router detection mechanism according to an embodiment of the invention suitable for identifying NSIS routers that may participate in a desired media format conversion in order to allow the establishment of the media session.
Figure 6:
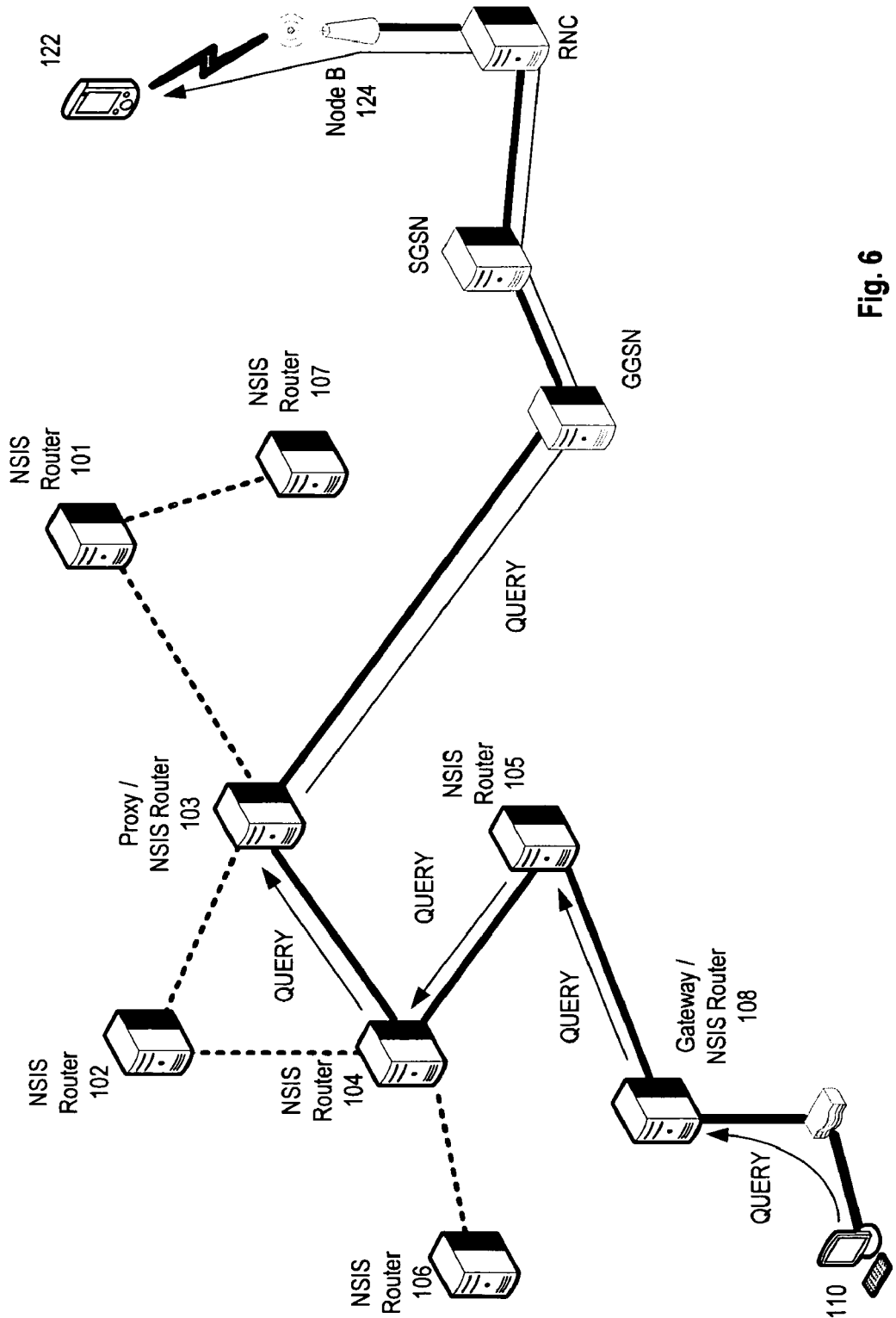
FIG. 6 to 9 show the exchange of messages of the on-path NSIS router detection mechanism of FIG. 5 through the overlay network of FIG. 2 between two terminals according to an exemplary embodiment of the invention.
Figure 7:
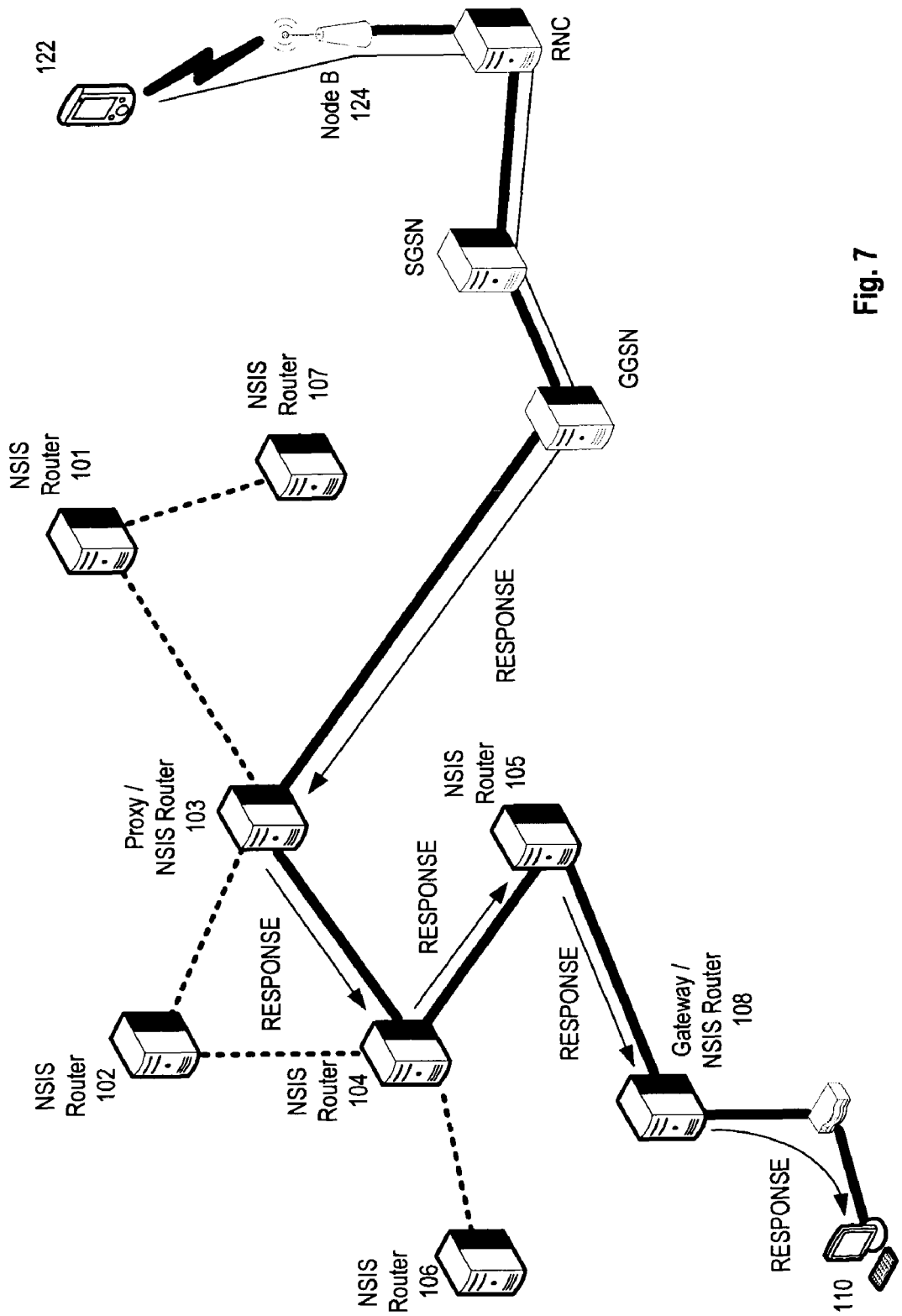
Figure 8:
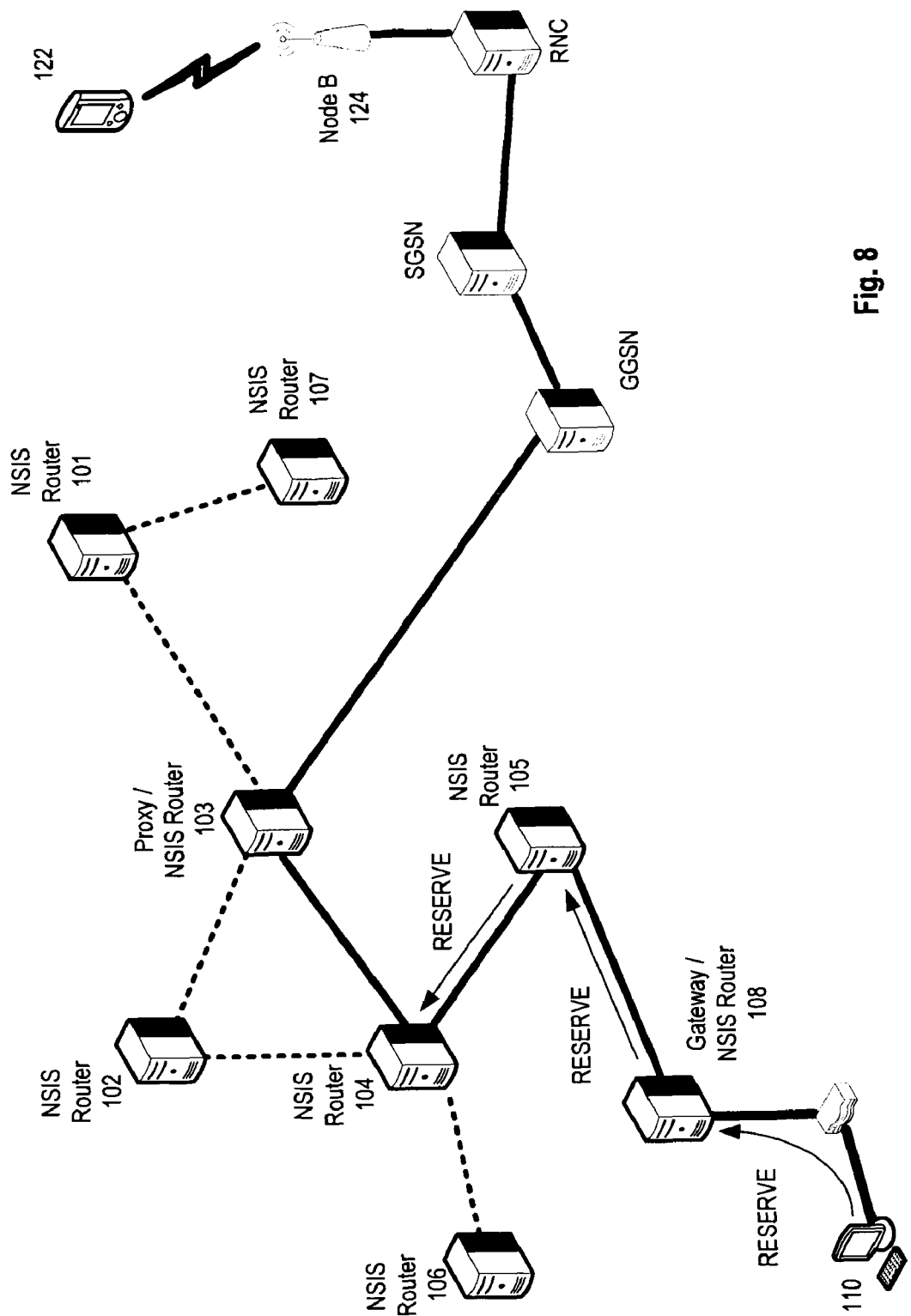
Figure 9:
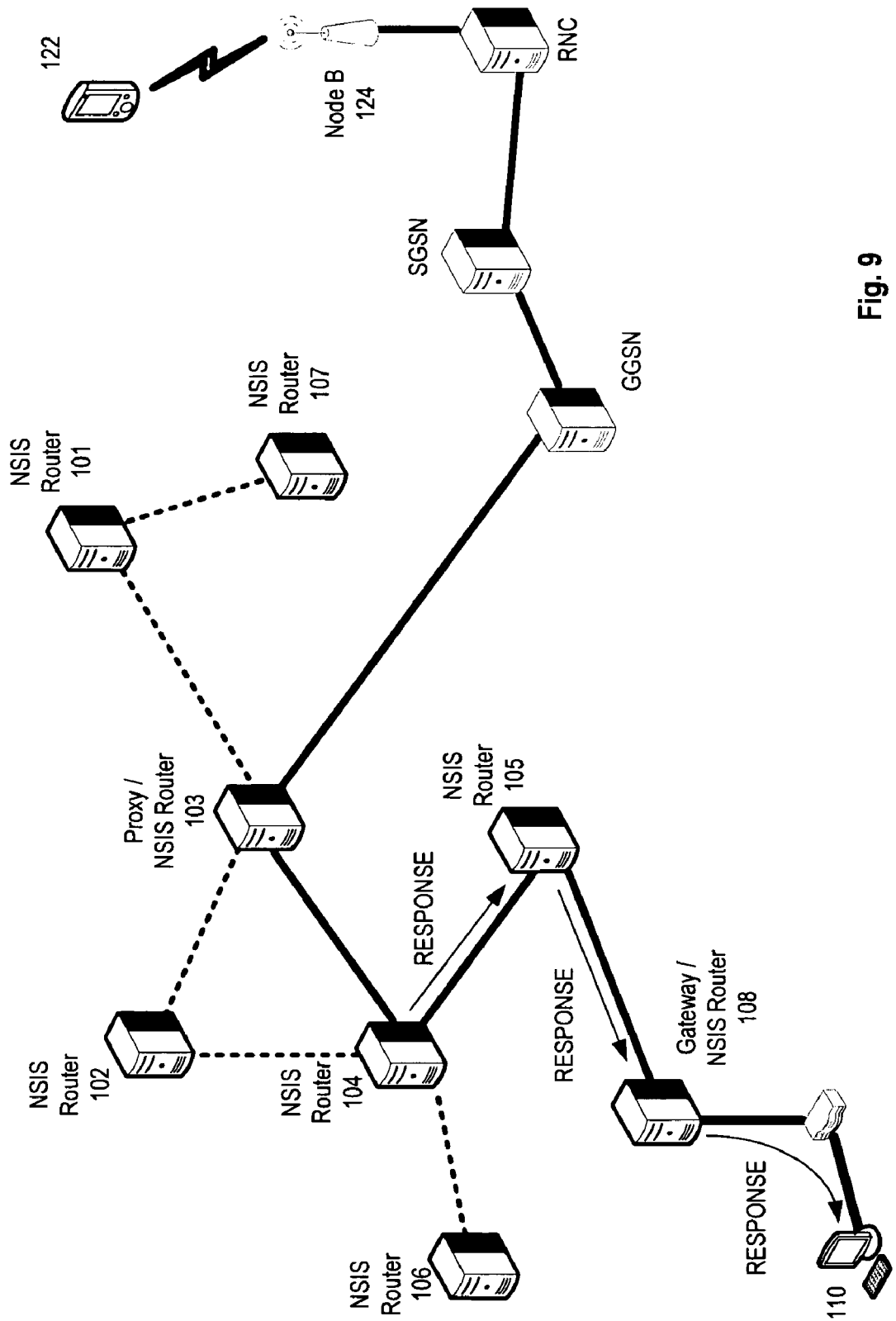

Next, the detection and reservation of media adaptation resources according to an exemplary embodiment of the invention is described in more detail. FIG. 5 shows an on-path NSIS router detection mechanism according to this embodiment of the invention suitable for identifying NSIS routers that may participate in a desired media format conversion in order to allow the establishment of the media session. In the exemplary embodiment, it is assumed, that terminal 110 (terminal A) tries to establish a media session with terminal 122 (terminal B).

For exemplary purposes, only the detection and reservation of media format adaptation nodes for the transmission of media data from terminal 110 to terminal 122 is illustrated. A similar detection and reservation process is employed by terminal 122 for the transmission of media data from terminal 122 to terminal 110.

First, the terminal 110 (or a proxy used by terminal 100) generates and sends a media adaptation node detection query to the next NSIS router 108. The query message is routed from one NSIS router to the next adjacent NSIS router on a hop-by-hop basis until it reaches terminal 122. The query message thereby routed along the path the media data encapsulated in the media transport protocol will travel upon starting the session. In the NSIS signaling framework, the NTLP protocol is capable of detecting the route (path) the packet data of the media stream(s) take through the network from terminal 110 to terminal 122. Hence, all intermediate NSIS routers along this route know their adjacent NSIS routers along the path, which allows them to forward the query message according to the NSLP protocol. The knowledge of the actual path the packet data of the media stream(s) take through the network allows for detecting media adaptation resources along the path: in order to query media format adaptation resources, the respective nodes need to implement the NSIS signaling framework including the NTLP and NSLP sublayer and the media data encapsulated in the media transport protocol need to pass the respective node to execute media data adaptation at the network node.

The query message includes a description of the media format adaptation required by terminal 110. Hence typically, terminal 110 (or a proxy of terminal 110) will search a NSIS Router interfacing media adaptation resources capable of converting media data in format X supported by terminal 110 but not supported by terminal 122 to a media format Y supported by terminal 122 but not supported by terminal 110. Proxies are typically used for supporting terminals in a service, if the terminals themselves do not implement required functionality, e.g. the NSIS media format adaption-NSLP suggested in this document. In the context of the NSIS media format adaption-NSLP discussed in more detail in the following sections this means that terminals may "register" at the proxy and the proxy provides a service to these terminals for detecting and reserving media format adaptation resources in the network.

According to this exemplary embodiment, upon the query message reaching terminal 122, terminal 122 (or a proxy of terminal 122) returns a response on a hop-by-hop basis along the same path the query has been provided from NSIS router to NSIS router until reaching terminal 122 (or its proxy). The NSIS routers each include their media format conversion capabilities to the response, if same matches the query.

Upon receiving the response at terminal 110 (or a proxy of terminal 110), same analyzes the response and chooses (in case there is more than one candidate NSIS router with the desire media adaptation capability) an NSIS router for media format conversion. In order to reserve resources at the chosen NSIS router for media format conversion, terminal 110 (or a proxy of terminal 110) sends a reserve message according to the NSLP protocol on a hop-by-hop basis to the chosen NSIS router, which returns a response message indicating whether the desired resources have been successfully reserved or not.

As indicated above, in case QoS constraints have to be met by the media session a similar mechanism as shown in FIG. 5 may be used to reserve network resources along the path of the media data from terminal 110 to terminal 122 (or between their proxies). If the NSIS signaling framework is used for network resource reservation, in a variation of the embodiment, the network resource query and reservation and the media format adaptation query and reservation may be combined.

The resulting signaling is similar to the one shown in FIG. 5, except for the following differences. The query message would specify the QoS constraints desired and the media format adaptation desired by terminal 110. Further, the response to the query message will also include information on the QoS the NSIS routers may provide. The reserve message will further comprise information on a QoS the NSIS routers along the path of the media data are requested to reserve as well as the media format adaptation request described above. Moreover, the reserve message would need to be passed to the terminal 122, as network resource would have to be reserved along the complete media data path from terminal 110 to terminal 122. Similarly, the response to the reserve message is generated at terminal 122 (or its proxy) and the response message will further indicate, whether all NSIS routers have been able to reserve network resources according to the request and media format adaptation resources according to the request have been reserved.

In a further variation of this embodiment, the media format adaption may not be required to directly convert the packet data from source format X to target format Y. It may also be possible to detect and utilize more than one media format adaptation node in the network. For example, a first NSIS router may convert media data in source format X into format Y' and a second NSIS router the media data in format Y' into the target format Y.

The query may for example specify the source and target format of the conversion, while all NSIS routers may include their adaptation capabilities to the query when forwarding the query towards terminal B, if suitable for the conversion.

For example, a first NSIS router may add information to the query indicating that it would be capable of transcoding the size of the MPEG video from 640×400 pixels to 320×200 pixels only, but may not convert the codec format before passing the query to the next NSIS router towards terminal B. If another NSIS router on the path to terminal B may provide the missing conversion from a MPEG video at 320×200 pixels to a DivX encoded video at 320×200 pixels, it may also indicate same in the query. Accordingly, the response may indicate which of the NSIS routers may provide a conversion from an intermediate/the source media format to an intermediate/the target media format. Also the combination of network resource detection and reservation with the detection an reservation of media format adaptation capabilities is possible.

In the following sections a more detailed implementation according to different embodiments of the invention of the media format adaptation detection and reservation mechanism will be described. In the following sections, it is assumed for exemplary purposes, that the SDP protocol is used to describe the media session (session description) and that the SIP protocol is used to convey the encapsulated session descriptions in SDP format and to initiate and control the media session between terminal 110 and terminal 122. In addition, it is assumed that the media stream(s) of the session are transported using the RTP protocol.

For a better understanding, the establishment of the media session may be split into two phases:

Phase I: The required media adaptation is ascertained, searched for and, if found, reserved. After media adaptation resources are reserved, this phase is terminated and followed by Phase II: Communication of final session details between the endpoints (terminals 110 and 122) and start of communication by using the previously reserved resources.

Using the conventional SDP protocol for the description of a media session, the endpoint requesting the media session (service) has no means to specify whether a respective stream of the session is a mandatory or optional constituent of the session and/or whether the session would be acceptable in case some of the requested streams of the session are not available. The user cannot express its readiness to perform or utilize media adaptation resources available locally at the endpoint or at a media format adaptation node in the network for the streams that he/she desires to receive.

According to one embodiment of the invention, an extension to the existing SDP protocol is proposed, which allows overcoming these shortcomings. According to this embodiment, a new pre-condition tag is introduced for each of the streams or for the session, which allows specifying whether each of the streams is a necessary part of the session or some streams can be left out if no adaptation is found (either "mandatory" or "optional", see below "strength tag").

In particular it is suggested to extend the pre-condition framework of SDP with a new media adaptation pre-condition. Besides the already existing "qos" token, a new token value for the pre-condition type is defined, namely "adaptation". Further to this new precondition, two new SDP attributes are defined, the target "a=target:" and "a=source:" attribute, which indicate the target/source of the media adaptation, e.g. to which target media format the media data in the source media format are transcoded. Optionally, also a new attribute for indicating the "footprint" of each intermediate node between transmitter (terminal 110) toward the receiver (122). The footprint may be provided in a semi-colon-separated list of values in the format described by the media-format parameter in the "a=intermediate:" line.

An exemplary definition of the new defined parameters is shown below:

| | |
|---|---|
| target-tag = | "a=target:" media-format |
| source-tag = | "a=source:" media-format |
| intermediate-tag = | "a=intermediate:value-type value-list |
| media-format = | payload type number |
| value-type = | format of the footprint, e.g., RTP SSRC. |
| value-list = | list of footprint identifiers | where

In the precondition framework a new token is introduced in the precondition types:

precondition-type="qos"|"adaptation"|token

The remaining definitions of the precondition framework are reused as specified in RFC 3312, available at http://www.ietf.org.

To establish a session, the user of terminal 110 sends an INVITE message of the SIP protocol comprising a session description of the media session setting a pre-condition for adaptation for one or more streams of the session according to the new SDP definition above. According to this exemplary embodiment, the pre-condition attribute informs terminal 122 that terminal 110 can receive the corresponding stream in the specified (suggested) media format but not in another media format. Thus, if it may be provided in the specified media format by terminal 122 as requested, media adaptation is not necessary.

At the same time, the pre-condition attribute may indicate to terminal 122 that terminal 110 does not want terminal 122 to be alerted of an incoming session until the pre-conditioned stream is available, i.e. an media adaptation resource is found and reserved.

An exemplary stepwise procedure of Phase I is described in the following. Terminal 122 may send an INVITE message comprising the following exemplary excerpt of the session description:

```
m=audio 20000 RTP/AVP 0
a=rtpmap:0 iLBC/8000
c=IN IP4 192.0.2.1
a=curr:qos e2e none
a=des:qos mandatory e2e sendrecv
a=curr:adaptation e2e none
a=des:adaptation mandatory e2e sendrecv
```

These lines specify that the session should include a bidirectional audio stream transported utilizing the RTP protocol at port no. 20000 and having payload type 0. The second line specifies that the audio stream of payload type 0 is an iLBC encoded audio stream with a sampling frequency of 8000 Hz. The remaining lines specify that adaptation is mandatory only in case the requested stream is not available, since no others stream would be accepted. That is, if this stream is not provided (either through adaptation or else) the session will not be established. The a=curr: indicates the current status of the adaptation, "none" means that at the moment of issuing this session offer the endpoint (terminal) has not reserved any adaptation end-to-end ("e2e") adaptation. The a=des: line indicates the desired adaptation in case the proposed media format is not accepted. The media adaptation has to be end-to-end adaptation in both directions (from terminal 110 to 122 and vice versa) in case bidirectional streams are communicated.

In the following the use terminal 110 and a proxy of terminal 110 (NSIS Router 108) as senders or receivers of NSIS messages is equivalent. Since it may be the terminal 110 or the proxy 108 that sends the NSIS messages, depending on whether the terminal 110 itself supports the NSIS media format adaptation-NSLP or whether the terminal 110 is attached to a proxy that provides for the detection and reservation signaling. If proxies are used for signaling in the session, the SIP user agent at both terminals 110 and 122 may be aware of the presence of the proxies, since the set of media adaptations required may be detected by exchanging SIP messages. Therefore, also an interface between SIP and the media format adaptation-NSLP may be provided.

If terminal 122 detects that it does not support the specified media format of the stream (e.g. the specified codec is not present), it sends a provisional response message (code 183) of the SIP protocol to terminal 110. As the pre-condition attribute indicated that the respective media stream may only be received by terminal 110 in the specified media format and due to the required codec not being available at terminal 122, terminal 122 knows that media format adaptation is necessary in order to establish the session. Therefore, as terminal 122 also supports the "adaptation" precondition, it may immediately start detecting and reserving media format adaptation resources along the media data path through the network from terminal 122 to terminal 110.

In more detail, terminal 122 receives the INVITE message including the exemplary session description shown above and notices that it doesn't support the iLBC codec, but may support as an alternative media format PCM encoded audio. In order to indicate the presence of the PCM codex as an alternative media format, terminal 122 amends the session description by setting the port no. to zero ("0") and adding a new payload type for the PCM codec, "1". Thus, terminal 122 amends the session description such that it includes a media format it supports for the audio stream and thereby indicates its readiness use media adaptation in order to establish the session.

An exemplary amended excerpt of the session description send by terminal 122 in the provisional response may look like the following:

```
m=audio 0 RTP/AVP 0 1
a=rtpmap:0 iLBC/8000
a=rtpmap:1 PCM/8000
c=IN IP4 192.0.2.4
a=curr:qos e2e none
a=des:qos mandatory e2e sendrecv
a=conf:qos e2e recv
a=curr:adaptation e2e unknown
a=des:adaptation mandatory e2e sendrecv
a=conf:adaptation e2e recv
```

Since terminal 122 uses the NSIS signaling framework for detecting and reserving media format adaptation resources, it may detect resources for providing media adaptation available in its "send" direction (terminal 122 to terminal 110), based in the response messages from the network to its query message, as already outlined above. However, it does not know the status of the reservations in the other direction, i.e. on the path the media data are routed from terminal 110 to terminal 122. Therefore, terminal 122 may proceed with requesting a confirmation for resource reservation in its "receive" direction to the terminal 110 by sending its provisional response.

More sloppily speaking, the provisional response message is "equivalent" to terminal 122 saying: "Ok, I will try to do media adaptation. I will not alert you until I have reserved the necessary resources". If the stream is bidirectional, terminal 122 indicates: "OK, I will try to do media format adaptation. I will not alert you until I have reserved the necessary resources. Could you please also try to do media adaptation and please do not alert me before you have reserved all necessary resources!"

In the example, it has been assumed the stream specified by the "m line" of the SDP description is bidirectional, i.e. it has either no attribute for directionality (no "a=sendrecv" attribute) or a "sendrecv" value in the pre-condition.

After having sent the response message, terminal 122 may start reserving media adaptation resources (and network QoS resources—if applicable) for the media stream. Terminal 110 acknowledges the response message with a PRACK (provisional response acknowledgement) and starts detection and reservation of media format adaptation resources on the media data path from terminal 110 to terminal 122.

Both terminals 110 and 122 use the NSIS signaling framework and the proposed media format adaptation NSLP protocol: Terminal 110 sends query messages towards terminal 122 and terminal 122 sends query messages towards terminal 110 as already outlined above under reference to FIG. 5.

When terminal 122 receives response messages confirming the reservation of media adaptation resources (and network QoS resources), terminal 122 waits until resources in the other direction are reserved as well, since it did not receive any confirmation and the preconditions still have not been met.

When terminal 110 receives response messages, it explicitly indicates in an updated session description what is input and output to the media adaptation processing: the input is indicated by the "a=source:<media format>" attribute (iLBC in this case) and the targeted output (indicated by "a=target:<media format>") is the requested codec in the answer (PCM). Then terminal 110 sends an UPDATE message (updated offer) of the SIP protocol to terminal 122 including the following exemplary excerpt of the updated session description:

```
m=audio 20000 RTP/AVP 0 1
a=rtpmap:0 iLBC/8000
a=rtpmap:1 PCM/8000
c=IN IP4 192.0.2.1
a=curr:qos e2e send
a=des:qos mandatory e2e sendrecv
a=curr:adaptation e2e send
a=source:0
a=target:1
a=des:adaptation mandatory e2e sendrecv
```

Terminal 122 responds with an answer message which also contains an updated session description with the current status of the media adaptation (and optionally network) resource reservation, the session description inter alia comprising the following portion:

```
m=audio 30000 RTP/AVP 0 1
c=IN IP4 192.0.2.4
a=rtpmap:0 iLBC/8000
a=rtpmap:1 PCM/8000
a=curr:qos e2e sendrecv
a=des:qos mandatory e2e sendrecv
a=curr:adaptation e2e sendrecv
a=des:adaptation mandatory e2e sendrecv
a=source:1
a=target:0
```

Note that at each "a=rtpmap" attribute there may be further codec specific (either iLBC or PCM) parameters specified in the session description. This may allow specifying with

```
a=rtpmap:31 H261/90000
a= pkt_rate=20; bw=20000
```

This session description "offers" a session comprising an audio stream in iLBC format at transported via RTP on port 49180 and a H261 encoded video stream at port 51372 transported via RTP. In the example discussed above, the parameters pkt_rate and bw are only shown for exemplary purposes. These parameters are shown as a simplified representation.

In response to this session description (offer), the initiating terminal may receive the following amended session description:

```
v=0
o=bob 2808844564 2808844564 IN IP4 host.biloxi.example.com
s=
c=IN IP4 host.biloxi.example.com
t=0 0
m=audio 49172 RTP/AVP 99
a=rtpmap:99 iLBC/8000
m=video 0 RTP/AVP 31 32
a=rtpmap:31 H261/90000
a=rtpmap:32 MPV/90000
a=pkt_rate=10; bw=150000
```

The answering terminal thereby offers an alternative codec for the video stream in MPEG2 (MPV) format with payload type 32.

A general definition the media adaptation resulting from the amended session description may be based on the following format:

| Current media streams available | Directionality | Desired media streams settings |
| --- | --- | --- |
| (<media_type_current, media_format_current>, <media_subtype_current>, <media_stream_parameters_set_current>) | <directionality> | (<media_type_desired, media_format_desired> <media_subtype_desired,>, <media_stream_parameters_set_desired>) | higher level of detail the exact media adaptation processing being done in the NSIS router(s) (media adaptation node(s)).

Description of Required Media Adaptation Processing

Next, the content of the query sent by the terminals 110 and 122 for detecting available media format adaption resources according to an exemplary embodiment of the invention is described in more detail. In order to find a candidate media adaptation node, a mechanism is needed to specify the required processing.

For example a session description offer may look like the following:

```
v=0
o=alice 2890844526 2890844526 IN IP4 host.atlanta.example.com
s=
c=IN IP4 host.atlanta.example.com
t=0 0
m=audio 49170 RTP/AVP 99
a=rtpmap:99 iLBC/8000
m=video 51372 RTP/AVP 31
```

A description of the media adaption required for in the example given above according to this format looks like the following:

```
{(media_type =video, media_format= 31), (media_subtype =H261),
(parameter_set: rate=90000; pkt_rate=20; bw=20000)} <->
{(media_type= video, media_format= 32), (media_subtype= MPEG2
(MPV)), (parameters: rate= 90000; pkt_rate=10; bw=150000)}
```

In the session description of the answering terminal above, the directionality may be determined by the sendrecv/sendonly and recvonly attribute for a media stream, "m=" line and is typically present in the "a=" line for each media line. If not present, sendrecv is assumed, otherwise the first n-tuple describes the input to the required media transformation and the second (and following) the desired output (or outputs). In the example for a representation of the required media adaption above, the bidirectionality is indicated by the "< >".

A hierarchically ordered n-tuple of required transformations which do not affect the data packet routing; typically changes in protocol headers up to Layer 4, UDP or TCP may affect routing, this is explained below. This hierarchical list may begin with the media type (audio/video/text, etc.), followed by the media subtype (codec) and payload type number (for RTP) and any mismatched media stream attributes.

The hierarchically ordered n-tuple of required transformations is obtained done by comparing "m=" line by "m=" line and their associated attributes, present in the attribute, "a=" lines. By comparing the "m=" lines, mismatches in the media type and the payload type (or "media format" as defined in SDP) may be ascertained. In the example above ("m=" line in bold font), there is a mismatch in the media format, as the answerer desires to have payload type 32. The next items in the ordered n-tuple is the media subtype and the media stream parameter sets, which are obtained from the "a=" lines. These attributes may express capabilities (media subtype (codec), codec settings et cetera) and user preferences, such as language or rating of the stream, e.g. "a=lang" for language.

The list of possible attributes that may cause adaptation needs can be obtained from the IANA under http://www.iana.org/assignments/sdp-parameters, under the attribute field list, "att-field". Furthermore, not every parameter mismatch means one more required adaptation since each codec defines own parameters. For allocating which parameters do trigger adaptation, there may be a look-up table of all codecs and codec parameters and all possible transformations thereof together with a set of rules and constraints of which transformations are allowed foreseen either in the terminals or available at media adaptation resources in the network. Unfortunately, to ascertain which conversions are meaningful and which are not may sometimes not be accomplished automatically. Therefore, a set of rules and constraints may be provided.

E.g., not all audio codecs have the same parameters, some are of variable bitrate and some have constant bitrate. Hence, there is not a straightforward conversion of a given configuration of a variable bitrate codec to a constant bitrate configuration. The set of parameters that would yield an equivalent (or good enough) adaptation have to be set manually by users. It is proposed that such rule and constraint lists are either included in a media adaptation description or referred to therein by means of a URI.

The description of a media adaptation may be achieved with extended session description protocols such as SDPng. In particular, the sdpng-rtp-video-txcodec package listed below could be such a container of rules and constraints. SDPng has a more sophisticated extended grammar that allows expressing capabilities and constraints. It also enables to reference to external resources (called packages in which the attributes used are defined). Therefore, another example representation of a different unidirectional transcoder functionality in SDPng could be:

```
<sdpng xmlns="http://www.iana.org/sdpng"
    xmlns:audio="http://www.iana.org/sdpng/audio"
    xmlns:rtp="http://www.iana.org/sdpng/rtp"
    xmlns:xsi="http://www.w3.org/2001/XMLSchema-instance"
    xsi:schemaLocation="http://www.iana.org/sdpng \
                        sdpng-base.xsd
    http://www.iana.org/sdpng/rtp/sdpng-rtp-pkg.xsd
    http://www.iana.org/sdpng/video/\
              sdpng-rtp-video-txcodec\
              pkg.xsd"
    owner="txcoding-service@example.com" id="98765432" \
                                        version="1">
  <cap>
    <rtp:udp name="rtpudpip6">[...]</rtp:udp>
```
-continued
```
  </cap>
  <cfg>
    <video:txcodec name="h263plus-mpg-txcodec">
      <video:input-encoding>H.263+</video:encoding>
      <video:input-resolution>QCIF</video:resolution>
      <video:input-framerate max="30"/>
      <video:ouput-encoding>MPEG-4</video:output-format>
      <video:output-resolution>QCIF</video:resolution>
      <video:output-framerate max="30"/>
    </video:txcodec>
  </cfg>
  <def>
    <rtp:udp name="rtp-def" ref="rtp:rtpudpip6">
      <rtp:pt-in>31</rtp:pt-in>
      <rtp:pt-out>32</rtp:pt-out>
    </rtp:udp>
  </def>
  <constraints>
    [where applicable]
  </constraints>
</sdpng>
```

The above description indicates that the Media Adaptation Resource that created this description supports transcoding from H263, QCIF resolution at a maximum of 30 frames per second to MPEG-4 video at the same resolution and frame rate. Also note that an additional package is required to understand the codec specific parameter of the codec, this is retrieved from "http://www.iana.org/sdpng/video/sdpng-rtp-video-txcodec-pkg.xsd". Note also that the payload type (media format) has to be changed from 31 to 32, to accommodate the answerer's request.

Further Aspects of Resource Detection & Reservation

The trigger for resource reservation may be in the network or from the client itself, depending if the latter implements the NSIS messaging or is attached to an NSIS proxy. In any case, the SIP user agent uses an interface to an NSIS entity in the terminal or in the network (proxy) for communicating the required processing steps to the NSIS entity. Hence, upon having determined the necessary media adaptation for a session, the SIP user agent may trigger the detection and reservation of resources either by sending itself a QUERY message of the NSIS media format adaptation-NSLP proposed herein including a description of the required media adaptation or by indicating to the proxy to do so.

The media format adaptation resource search and reservation may for example be triggered after the detection and reservation of network QoS resources, in case QoS pre-conditions are present in the session description. This has the advantage to abandon detection and reservation, if the necessary network QoS resources may not be reserved. Alternatively, the media format adaptation and network QoS may be triggered (and performed) in parallel or together, i.e. the NSLP messages include the QoS-NSLP signaling information in addition to the media format adaptation-NSLP signaling information described herein.

There are several cases that can be encountered when searching media adaptation capabilities in the network. In the desirable case, all adaptation resources needed are found on the media path from terminal 110 to terminal 122 (and vice versa). However, it may also be the case that some required media adaptation resources or all of them are not detected (not present) on the media data path from terminal 110 to terminal 122 (and vice versa).

If some resources are missing, the NSIS media format adaptation-NSLP application may enable searching for media adaptation resources "off-path", i.e. also at NSIS routers "close to" (for example in terms of hops, latency, etc.) the NSIS routers on the media data path from terminal 110 to terminal 122. This enhancement proposed by a further embodiment of the invention may also include an information exchange scheme for NSIS routers allowing to exchange available media adaptation capabilities, such that a NSIS router is also aware of media adaption capabilities of "nearby" NSIS routers. For example, XML may be used to define capability descriptions. By providing this information exchange scheme, the latency in the detection of available media format adaptation resources may be reduced.

Once all media adaptation (and network QoS) resources have been found and reserved by the terminal 110, it sends an UPDATE message of the SIP protocol to terminal 122 as already discussed previously. Terminal 122 may returns a 200 (OK) response for the UPDATE message indicating that all the preconditions for the session have been met at its end as well. At this point in time, terminal 122 starts alerting the user, and session establishment completes according to the SIP protocol specifications.

Messages for the Media Format Adaptation-NSLP

In the following exemplary definitions of the NSLP messages exchanged for detecting and reserving media adaptation resources in the network. The messages are not described in detail but only its functionality.

QUERY Message

The query message is used by the terminals (or their proxies) to "probe" the network for the required media adaptation resources and includes a description of the required media format adaptation.

RESERVE Message

The reserve message modifies the state on NSIS routers or its associated processors. The reserve messages may be used to reserve and—optionally—to change the current settings of a media adaptation resource reservation at an NSIS router.

RESPONSE Message

The response message may be used to provide information about the result of a query (query message) or a resource reservation request (reserve message).

NOTIFY Message

NOTIFY messages may be used to convey information to a NSIS-router. They differ from RESPONSE messages in that they are sent asynchronously and need not refer to any particular state or previously received message. The information conveyed by a NOTIFY message is typically related to error conditions. Examples would be notification to an upstream peer about state being torn down or to indicate when a reservation has been pre-empted.

SUBSCRIBE Message

This message may be optionally defined, in case "off-path" detection and reservation of media adaptation resources is implemented. This message is used to subscribe to peer NSIS-routers in order to receive notifications about the media capabilities available at the adjacent peer NSIS routers.

The MediaSpec

The following sections define the individual formats of the NSIS media format adaptation NSLP messages above. The format definition of the NSIS media format adaptation-NSLP defined herein is also refereed to as the MediaSpec in the following.

The format of the data in the MediaSpec contents field of the exemplary messages defined herein is based on the following MediaSpec template:

```
+------------------+------------------+------------------+
| MediaSpec/Ctrl. Inf. |   Mandatory     |    Optional     |
|    Object ID     | MediaSpec Params.| MediaSpec Params.|
+------------------+------------------+------------------+
```

For example the RESERVE message may look like:

```
RESERVE = COMMON_HEADER
    RSN [ RII ] [ REFRESH_PERIOD ] [ BOUND_SESSION_ID ]
    [ POLICY_DATA ] [QSPEC][ MediaSpec ]
```

An alternative definition of the RESERVE message has the following format and content:

```
RESERVE = COMMON_HEADER
    RSN [ RII ] [ REFRESH_PERIOD ] [ BOUND_SESSION_ID ]
    [ POLICY_DATA ] [ *QSPEC including the MediaSPEC data]
```

These messages are transported between NSIS routers using the NSIS Transport Layer Protocol, NTLP. A current definition for an NTLP protocols is defined in the IETF internet draft "GIMPS: General Internet Messaging Protocol for Signaling" mentioned above.

Control Information Object

The Control Information object is identified by an Object ID (for example Object ID=0) and is mandatory for each NSLP message according to this embodiment. It is used to convey control information.

Media Adaptation Desired Object

The first object is the Media Adaptation Desired object, which may for example have an Object ID=1. This Object contains at least a parameter for the description of the media adaptation processing required. For simplicity, it is assume just one adaptation is required. However, several media adaptation steps may be required, e.g. if a stream has to be first transcoded and then encrypted. The description of the required media adaptation processing may be obtained as described above (see section "Description of required Media Adaptation Processing").

One very important characteristic of this media adaptation processing is that the signaling packets shall follow the same route as the data packets. This is ensured by finding out the Message Routing Information (MRI, see IETF internet draft "GIMPS: General Internet Messaging Protocol for Signaling", section 5.8.1.1), which defines the set of protocol headers that determine the routing of a packet and which shall be equal on signaling and data packets so that the signaling is really "on-path". Therefore, the data packets cannot suffer any change in any of the MRI fields:

```
MRI = { network-layer-version, source-address, prefix-length,
    destination-address, prefix-length, IP-protocol, diffserv-codepoint,
    [ flow-label ], [ ipsec-SPI / Layer 4-ports]}
```

In the definition above, brackets indicate an optional presence of the parameter.

Since MRI information is what determines the routing of packets, the media adaptation processing descriptions therefore shall not modify any details on the network-layer-version, source-address, prefix-length, destination-address, prefix-length, IP-protocol, diffserv-codepoint or port numbers, flow labels or IPSec SPI values of the data packets.

The Media Adaptation Desired Object and the description of the media adaptation processing required may be included in QUERY message or RESERVE messages. E.g., in the case of streaming, the specification of the type (video) and the subtype name (e.g. "H261txcoder" for H261 video transcoder) and the parameters required to be supported are enough. Additionally, the QUERY message may be more general, and just ask for a video transcoding functionality to which the overlay node shall list all available transcoders available in the Media Adaptation Available Object.

If a Media Adaptation Desired object is included in a RESERVE message, it requests a specific media adaptation configurations and resources at a NSIS router to which the RESERVE message is destined. If multiple processing steps are required for media adaptation, multiple Media Adaptation Desired objects may be cascaded in meaningful order. Processing definitions having the same ID may represent alternatives.

Description field according to different embodiments of the invention.

Control Information Object

The MediaSpec Control Information object is identified by an Object ID (for example Object ID=0) and are mandatory for each NSLP message according to this embodiment.

According to an embodiment of the invention different formats of Control Information objects are provided, which may be identified based on their Parameter ID.

A first format is referred to as the <MediaSpec Hops> format (Parameter ID=1). The data included in this control information object indicates the number of NSIS entities that understand the NSIS media format adaptation-NSLP messages defined herein, i.e. the NSIS routers according to the terminology herein. This number is included in the MediaSpec Hops field. Each media adaptation-capable NSIS router increases this counter by one.

The <MediaSpec Hops> format may be defined as follows:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Object ID = 0   |  Parameter ID = 1 |            Length             |
+-+-+-+-+-+-+-+-+-+-+-+-+-+-+-+-+-+-+-+-+-+-+-+-+-+-+-+-+-+-+-+-+
//                        MediaSpec Hops                             //
+-+-+-+-+-+-+-+-+-+-+-+-+-+-+-+-+-+-+-+-+-+-+-+-+-+-+-+-+-+-+-+-+
```

Media Adaptation Available Object

The second object is the Media Adaptation Available object, which could be identified by an Object ID=2. Depending on the message into which this object is placed it is placed, it may be subject to modification by intermediate NSIS routers or not. If the object is included in a RESPONSE message, the information carried by the object is not modified. If it is included in a QUERY message, each NSIS router may add available resources in a Media Adaptation Available object to the object. For example, the added information may be included in <cap> and <cfg> tags if SDPng is used. Alternative media adaptation configurations, ranges and parameter lists are allowed to be comprised in the object. Returning to the SDPng example, meaningful alternatives may be expressed e.g., with the <cfg> and <alt> tags in SDPng.

Media Adaptation Reserved Object

The third object is the Media Adaptation Reserved object, which may be identified by Object ID=3. It has similar format as the Media Adaptation Desired Object and is carried in RESPONSE messages sent in response to RESERVE messages. Its functionality is to confirm the resources reserved, by including a Media Adaptation description of the resources at the respective NSIS router that have been reserved for the media session (parameter ID=4).

MediaSpec Object and Parameter Description

The following sections will provide a more detailed definition of the different objects included in the MediaSpec Another format is the <Inspect Neighborhood> format (Parameter ID=2) that specifies whether the NSIS-router shall forward the message comprising the control information object to other NSIS-routers that are not on-path (e.g. no if "Hop distance to explore" equals zero ("0"), yes otherwise). A QUERY message containing this parameter may be replicated on all interfaces of the NSIS router (except on the one that received it) and may be sent unchanged, except for the "Decreasing count of hops" counter being reduced in one unit for each visited NSIS router. It has the following format:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Object ID = 0   |  Parameter ID = 2 |            Length             |
+-+-+-+-+-+-+-+-+-+-+-+-+-+-+-+-+-+-+-+-+-+-+-+-+-+-+-+-+-+-+-+-+
//                     Hop distance to explore                       //
+-+-+-+-+-+-+-+-+-+-+-+-+-+-+-+-+-+-+-+-+-+-+-+-+-+-+-+-+-+-+-+-+
//                     Decreasing count of hops                      //
+-+-+-+-+-+-+-+-+-+-+-+-+-+-+-+-+-+-+-+-+-+-+-+-+-+-+-+-+-+-+-+-+
```

More specifically the <Length> field indicates length of the parameter in bytes of the payload after this field in both examples above. The <Hop Distance to explore> field indicates the number of hops or NSIS entities that are to receive the message and should check for additional media adaptation capabilities. This number is not reduced.

Further, in order to limit the number of hops a message is propagated "off-path" a <Decreasing count of hops> field is included, which is decreased. The reason for two counters is the control of the forwarding behavior of the NSIS routers receiving the message including the control information object: in case both counter values are the same (different from zero), then the NSIS router forwards the message on all but two interfaces: the one that message has received on and the one that is on-path to the other terminal. Otherwise, the NSIS router forwards the message on all interfaces of the NSIS router except the one it has received the message on.

Media Adaptation Desired Object

The Media Adaptation Desired object (including at least one of parameters with ID=3 or 4) contains (a) description(s) of the desired media adaptation capabilities (to query or to reserve). Each NSIS router inspects the object and includes matching capabilities in a Media Adaptation Available object. There are at least two parameters included in this object. A parameter with ID=3 for querying for media adaptation capabilities in QUERY messages and a Parameter with ID=4 for reserving resource when including the object in RESERVE messages.

The format may for example look like:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Object ID = 1  |  Parameter ID = 3 |  Length (bytes)  |     MAID = 1     |
+-+-+-+-+-+-+-+-+-+-+-+-+-+-+-+-+-+-+-+-+-+-+-+-+-+-+-+-+-+-+-+-+
//              Media Adaptation Description                   //
+-+-+-+-+-+-+-+-+-+-+-+-+-+-+-+-+-+-+-+-+-+-+-+-+-+-+-+-+-+-+-+-+
| Parameter ID = 3 |  Length (bytes)  |     MAID = 2     |     //
+-+-+-+-+-+-+-+-+-+-+-+-+-+-+-+-+-+-+-+-+-+-+-+-+-+-+-+          //
//              Media Adaptation Description                   //
+-+-+-+-+-+-+-+-+-+-+-+-+-+-+-+-+-+-+-+-+-+-+-+-+-+-+-+-+-+-+-+-+
```

The Media Adaptation Desired objects which contain this parameter (ID=3) are analyzed by each NSIS router receiving a message comprising the object and may trigger the inclusion of a Media Adaptation Available object in the QUERY message, the Media Adaptation Available object being returned to the initiator of the QUERY message in a RESPONSE message.

The Media Adaptation Desired object with Parameter ID=4 may have the following exemplary format:

Media Adaptation Desired objects containing the parameters with ID=4 as indicated above allow the terminals (or their proxies) to reserve the requested media adaptation resources, as they are described in the Media Adaptation Description field. If the reservation was successful then a parameter with ID=4 including the details of the reservation (i.e. an exact description of the media adaption for which resources are reserved) is returned in the RESPONSE message inside the Media Adaptation Reserved object below; otherwise a Media Adaptation Desired object including a Parameter ID=6 may be returned indicating the cause of failure to reserve resources.

The parameters with ID=4 included in the Media Adaptation Desired objects in a RESERVE message are "popped off", i.e. removed from the object once the reservation has been successful. Parameters with ID=4 are ordered inside the Media Adaptation Desired object in RESERVE messages, since for media adaptation the order is meaningful.

The meaning of the fields defined above is as follows. The <MAID> field indicates the Media Adaptation ID. The MAID identifies which Media Adaptation description is referred to. For the responses to QUERY messages there can be more

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Object ID = 1  |  Parameter ID = 4 |  Length (bytes)  |     MAID = 1     |
+-+-+-+-+-+-+-+-+-+-+-+-+-+-+-+-+-+-+-+-+-+-+-+-+-+-+-+-+-+-+-+-+
//                       Network ID                            //
+-+-+-+-+-+-+-+-+-+-+-+-+-+-+-+-+-+-+-+-+-+-+-+-+-+-+-+-+-+-+-+-+
//              Media Adaptation Resource ID                   //
+-+-+-+-+-+-+-+-+-+-+-+-+-+-+-+-+-+-+-+-+-+-+-+-+-+-+-+-+-+-+-+-+
//           Media Adaptation Resource Session ID              //
+-+-+-+-+-+-+-+-+-+-+-+-+-+-+-+-+-+-+-+-+-+-+-+-+-+-+-+-+-+-+-+-+
//           Media Adaptation E2E Session Footprint            //
+-+-+-+-+-+-+-+-+-+-+-+-+-+-+-+-+-+-+-+-+-+-+-+-+-+-+-+-+-+-+-+-+
//         Media Adaptation        Description                 //
+-+-+-+-+-+-+-+-+-+-+-+-+-+-+-+-+-+-+-+-+-+-+-+-+-+-+-+-+-+-+-+-+
|                  |  Parameter ID = 4 | Length (bytes)  |     MAID = 2     |
+-+-+-+-+-+-+-+-+-+-+-+-+-+-+-+-+-+-+-+-+-+-+-+-+-+-+-+-+-+-+-+-+
//                       Network ID                            //
+-+-+-+-+-+-+-+-+-+-+-+-+-+-+-+-+-+-+-+-+-+-+-+-+-+-+-+-+-+-+-+-+
//              Media Adaptation Resource ID                   //
+-+-+-+-+-+-+-+-+-+-+-+-+-+-+-+-+-+-+-+-+-+-+-+-+-+-+-+-+-+-+-+-+
//           Media Adaptation Resource Session ID              //
+-+-+-+-+-+-+-+-+-+-+-+-+-+-+-+-+-+-+-+-+-+-+-+-+-+-+-+-+-+-+-+-+
//           Media Adaptation E2E Session Footprint            //
+-+-+-+-+-+-+-+-+-+-+-+-+-+-+-+-+-+-+-+-+-+-+-+-+-+-+-+-+-+-+-+-+
//              Media Adaptation Description                   //
+-+-+-+-+-+-+-+-+-+-+-+-+-+-+-+-+-+-+-+-+-+-+-+-+-+-+-+-+-+-+-+-+
``` than one Media Adaptation Resource matching the query and willing to grant resources, i.e., there may be several parameters with ID=5 present having the same MAID in the Media Adaptation Available object. However, there may be only one parameter with ID=4 per MAID value in RESERVE messages.

The <Network ID> field contains a globally unique network ID that identifies the node where the media adaptation resource is addressable. This may be for example. an identifier to a node (e.g. NSIS router) hosting a set of Media Adaptation resources. The network ID included must not necessarily be that of the resource itself, but may also be the network ID of the NSIS router administering it. For example, an IPv6 address or other kind of global identifier, like a HIT tag from the IETF Internet draft "Host Identity Protocol Architecture" (draft-ietf-hip-arch-03.txt), available at http://www.ietf.org, may be used as a network ID. In some cases, this ID may not necessarily have global uniqueness, e.g., in the case of virtualization through IP-in-IP tunnels, such as currently deployed VPN (virtual private network) technologies. In these cases, it is enough that the Network ID (e.g., IP address) is unique within the "virtual network" that has been created through the tunneling. The network ID may also be useful in cases where the resources are not found on-path and have to be reached through other means, possible off-path communication like IP tunnels or other means.

The <Media Adaptation Resource ID> field comprises an application ID. The application ID identifies a media adaption resource at the node identified by the network ID, e.g. a transcoder, a flow splitter. The Media Adaptation Resource ID may be for example a SIP URI.

Further, the <Media Adaptation Resource Session ID> field comprises a unique session identifier among all session identifiers used by the resources in the current media adaptation path. This identifier is used for addressing the resources a media adaptation node (NSIS router) offers, e.g. a particular session of a transcoding application with certain input/output parameters. Upon request the media adaptation resource issues this identifier, which is then used whenever the configuration of the session has to be changed or adjusted. This allows that several media data paths use the same media adaptation resource concurrently. The Media Adaptation Resource Session ID may be unique among all sessions that the media adaptation resource is serving. The Media Adaptation Resource Session ID field is issued by media adaptation resources in the visited NSIS-routers whose available media adaptation capabilities match those of the query and are willing to allocate a session.

The <Media Adaptation E2E Session Footprint> field may be optionally included and comprises an identifier inserted by a media adaptation resource may for letting the endpoint node who has actually processed the packet. E.g. this "footprint" may be the Contributing Synchronizing Source identified or CSRC of the Real-time Transport Protocol, RFC 3550, available at http://www.ietf.org.

This information can be useful to detect failure of the routing or the Media Adaptation nodes, since RTCP packets report on the number of packets that are received from each synchronizing source, including the contributing sources which in this case are the Media Adaptation resources reserved. The footprints used by the different media adaptation resources reserved may be communicated to the endpoints in order to explicitly inform the endpoint about which nodes will be processing the data that it will receive. The communication of this footprints is done through the UPDATE message in SIP, using the proposed extension to the pre-condition framework, "a=intermediate:".

The <Media Adaptation Description> field contains a description of the functionality searched for.

For illustration purposes, the required configuration desired for a transcoding processing can be expressed in SDPng as follows:

```
<sdpng xmlns="http://www.iana.org/sdpng"
    xmlns:audio="http://www.iana.org/sdpng/audio"
    xmlns:rtp="http://www.iana.org/sdpng/rtp"
    xmlns:xsi="http://www.w3.org/2001/XMLSchema-instance"
    xsi:schemaLocation="http://www.iana.org/\
                sdpng sdpng-base.xsd
    http://www.iana.org/sdpng/rtp/sdpng-rtp-pkg.xsd
    http://www.iana.org/sdpng/video/sdpng-rtp-video-\
                                        txcodec-pkg.xsd"
owner="txcoding-service@example.com" id="98765432" \
                                        version="1">
    <cap>
        <rtp:udp name="rtpudpip6">[...]</rtp:udp>
    </cap>
    <def>
        <rtp:udp name="rtp-def" ref="rtp:rtpudpip6">
            <rtp:pt-in>31</rtp:pt-in>
            <rtp:pt-out>32</rtp:pt-out>
        </rtp:udp>
    </def>
    <cfg>
      <video:txcodec name="h263plus-mpg-txcodec">
          <video:input-encoding>H.263+</video:encoding>
          <video:input-resolution>QCIF</video:resolution>
          <video:input-framerate max="30"/>
          <video:ouput-encoding>MPEG-4</video:output-format>
          <video:output-resolution>QCIF</video:resolution>
          <video:output-framerate max="30"/>
      </video:txcodec>
    </cfg>
    <constraints>
    [...where applicable...]
    </constraints>
</sdpng>
```

In the case of requiring the reservation of multiple resources, the object contains multiple parameters with ID=4 in reservation order, since some media adaptations may require order. For example, it may not possible to transcode a video without separating video and audio first.

In cases where an media adaptation resource is not on the media data path from one terminal to the other, the Network ID may be used to establish tunnels to NSIS routers "off-path" that administer resources necessary to for the desired media format adaptation which implies that a deviation from the "default media data path" is required. When a NSIS router detects that the requested media adaptation resource is not hosted by it (the Network ID address is different from own), then it may establish a tunnel to the indicated NSIS router and may request media adaptation processing using the Media Adaptation Resource ID and the Media Adaptation Session ID.

Media Adaptation Available Object

As has been indicated above this object may be contained in responses to QUERY messages and RESERVE messages. It is included in QUERY messages and is also included in the RESPONSE message returned to the initiator. The Media Adaptation Available object may have the following structure:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Object ID = 2   | Parameter ID = 5  |  Length (bytes)   |   MAID = 1        |
+-+-+-+-+-+-+-+-+-+-+-+-+-+-+-+-+-+-+-+-+-+-+-+-+-+-+-+-+-+-+-+-+
|    Nr hops        |    Nr hops        |                                       |
|    to source      |    away from path |                reserved               |
+-+-+-+-+-+-+-+-+-+-+-+-+-+-+-+-+-+-+-+-+-+-+-+-+-+-+-+-+-+-+-+-+
//                         Network ID                         //
+-+-+-+-+-+-+-+-+-+-+-+-+-+-+-+-+-+-+-+-+-+-+-+-+-+-+-+-+-+-+-+-+
//                  Media Adaptation Resource ID              //
+-+-+-+-+-+-+-+-+-+-+-+-+-+-+-+-+-+-+-+-+-+-+-+-+-+-+-+-+-+-+-+-+
//              Media Adaptation Resource Session ID          //
+-+-+-+-+-+-+-+-+-+-+-+-+-+-+-+-+-+-+-+-+-+-+-+-+-+-+-+-+-+-+-+-+
//                 Media Adaptation Resource Cost             //
+-+-+-+-+-+-+-+-+-+-+-+-+-+-+-+-+-+-+-+-+-+-+-+-+-+-+-+-+-+-+-+-+
//               Media Adaptation E2E Session Footprint       //
+-+-+-+-+-+-+-+-+-+-+-+-+-+-+-+-+-+-+-+-+-+-+-+-+-+-+-+-+-+-+-+-+
//                  Media Adaptation Description              //
                   +-+-+-+-+-+-+-+-+-+-+-+-+-+-+-+-+-+-+-+-+-+-+-+
                   | Parameter ID = 5  |  Length (bytes)   |   MAID = 2        |
                   +-+-+-+-+-+-+-+-+-+-+-+-+-+-+-+-+-+-+-+-+-+-+-+
|    Nr hops        |    Nr hops        |                                       |
|    to source      |    away from path |    reserved                           |
+-+-+-+-+-+-+-+-+-+-+-+-+-+-+-+-+-+-+-+-+-+-+-+-+-+-+-+-+-+-+-+-+
//                         Network ID                         //
+-+-+-+-+-+-+-+-+-+-+-+-+-+-+-+-+-+-+-+-+-+-+-+-+-+-+-+-+-+-+-+-+
//                  Media Adaptation Resource ID              //
+-+-+-+-+-+-+-+-+-+-+-+-+-+-+-+-+-+-+-+-+-+-+-+-+-+-+-+-+-+-+-+-+
//              Media Adaptation Resource Session ID          //
+-+-+-+-+-+-+-+-+-+-+-+-+-+-+-+-+-+-+-+-+-+-+-+-+-+-+-+-+-+-+-+-+
//                 Media Adaptation Resource Cost             //
+-+-+-+-+-+-+-+-+-+-+-+-+-+-+-+-+-+-+-+-+-+-+-+-+-+-+-+-+-+-+-+-+
//               Media Adaptation E2E Session Footprint       //
+-+-+-+-+-+-+-+-+-+-+-+-+-+-+-+-+-+-+-+-+-+-+-+-+-+-+-+-+-+-+-+-+
//                  Media Adaptation Description              //
+-+-+-+-+-+-+-+-+-+-+-+-+-+-+-+-+-+-+-+-+-+-+-+-+-+-+-+-+-+-+-+-+
```

As can be seen above, the object comprises one of more available media adaptation application sessions available for reservation at a particular NSIS router or set of routers, e.g., several parameters with ID=5. The availability of these resources has a soft state. If the resources are not reserved after a given time, the allocated resources and the ad-hoc created identifiers Media Session ID and E2E Session Footprint expire. This is to avoid unnecessary reservations.

In this manner, <Media Adaptation ID> is needed to identify the matching parameter (ID=4) in the Media Adaptation Desired object to which this (these) parameter(s) (ID=5) in the Media Adaptation Available object responds. Those parameters having the same Media Adaptation ID are alternative.

The following fields are filled in by visited nodes, i.e. those NSIS routers through which the message comprising the object passes, when their capabilities match those of the query and are willing to allocate resources: The <Nr hops to source Count> field specifies the number of hops via which the message has been forwarded from the initiating NSIS Entity (e.g. terminal 110 or 122 or their proxies respectively). The <No Hops away from path> field is used in case that the resource was not found on the default media data path and describes how many hops the media adaption resource is away from the default media path.

The <Media Adaptation Resource Cost> field indicates the cost of reserving this processing at this node. The costs may be any kind of cost metric. Further parameters may be defined, each containing a different cost model.

The <Network ID> field, the <Media Adaptation Resource ID> field, the <Media Adaptation Resource Session ID> field and the <Media Adaptation E2E Session Footprint> have a similar functionality as described above.

The <Media Adaptation Description> field comprises a description of the functionality available on the Media Adaptation Resource found. The following re-uses the SDPng example above:

```
<sdpng xmlns="http://www.iana.org/sdpng"
      xmlns:audio="http://www.iana.org/sdpng/audio"
      xmlns:rtp="http://www.iana.org/sdpng/rtp"
      xmlns:xsi="http://www.w3.org/2001/XMLSchema-instance"
      xsi:schemaLocation="http://www.iana.org/\
                          sdpng sdpng-base.xsd
      http://www.iana.org/sdpng/rtp/sdpng-rtp-pkg.xsd
      http://www.iana.org/sdpng/video/sdpng-rtp-video-\
                          txcodec-pkg.xsd"
owner="txcoding-service@example.com" id="98765432" \
                          version="1">
   <cap>
       <rtp:udp name="rtpudpip6">
           <rtp:pt-in>31 34</rtp:pt-in>
           <rtp:pt-out>32 35</rtp:pt-out>
       </rtp:udp>
   </cap>
   <cfg>
       <video:txcodec name="h263plus-mpg-txcodec">
           <video:input-encoding>H.263+</video:encoding>
           <video:input-resolution>QCIF</video:resolution>
           <video:input-framerate max="30"/>
```

-continued

```
        <video:ouput-encoding>MPEG-4</video:output-format>
        <video:output-resolution>QCIF</video:resolution>
        <video:output-framerate max="30"/>
      </video:txcodec>
    </cfg>
    <constraints>
    [...where applicable...]
    </constraints>
</sdpng>
```

The description above additionally indicates that the media adaptation resource that created this description supports transcoding from H263, QCIF resolution at a maximum of 30 frames per second to MPEG-4 video at the same resolution and frame rate. Also note that an additional package is required to understand the codec specific parameter of the codec, which can be retrieved from "http://www.iana.org/sdpng/video/sdpng-rtp-video-txcodec-pkg.xsd".

In similar manner other transcoding parameters may be expressed, according to SDPng rules. Note that the description only mentions capabilities and one configuration. There could be also some alternative configurations and, where applicable, constraints. However, since this is just a Media Adaptation Available object there are no definition and configuration tags (or elements) since no reservation is done. Note also that SDPng has the possibility to list alternative configurations under the <cfg> and <alt> tags. Note that also ranges and parameter lists are possible (RTP payload type ranges may be explicitly listed, rtp:pt).

Media Adaptation Reserved Object

This Object confirms the reserved resources. In the normal operation, its parameters include the same information as the Media Adaptation Desired objects with Parameter ID=4 transmitted in the RESERVE message. However, it may be possible that due to local policies the NSIS router or its resource changes some details of the session, such as port on which the resource is available.

The Media Adaptation Reserved object requires a new parameter to indicate the Media Adaptation reservation failed, Parameter ID=6. This informs about the failure of a reservation with an error code and a proposal for a successful reservation. The following example shows a packet structure informing the terminal (or its proxy) that issued a RESERVE message that a first reservation was successful while the second reservation was not:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Object ID = 3  |  Parameter ID = 4 |  Length (bytes)  |   MAID = 1   |
+-+-+-+-+-+-+-+-+-+-+-+-+-+-+-+-+-+-+-+-+-+-+-+-+-+-+-+-+-+-+-+-+
//                         Network ID                           //
+-+-+-+-+-+-+-+-+-+-+-+-+-+-+-+-+-+-+-+-+-+-+-+-+-+-+-+-+-+-+-+-+
//                  Media Adaptation Resource ID                //
+-+-+-+-+-+-+-+-+-+-+-+-+-+-+-+-+-+-+-+-+-+-+-+-+-+-+-+-+-+-+-+-+
//              Media Adaptation Resource Session ID            //
+-+-+-+-+-+-+-+-+-+-+-+-+-+-+-+-+-+-+-+-+-+-+-+-+-+-+-+-+-+-+-+-+
//              Media Adaptation E2E Session Footprint          //
+-+-+-+-+-+-+-+-+-+-+-+-+-+-+-+-+-+-+-+-+-+-+-+-+-+-+-+-+-+-+-+-+
//                 Media Adaptation Description                 //
|                  +-+-+-+-+-+-+-+-+-+-+-+-+-+-+-+-+-+-+-+-+-+-+
|                  |  Parameter ID = 6 |  Length (bytes)  |   MAID = 2   |
+-+-+-+-+-+-+-+-+-+-+-+-+-+-+-+-+-+-+-+-+-+-+-+-+-+-+-+-+-+-+-+-+
//                         Network ID                           //
+-+-+-+-+-+-+-+-+-+-+-+-+-+-+-+-+-+-+-+-+-+-+-+-+-+-+-+-+-+-+-+-+
//                  Media Adaptation Resource ID                //
+-+-+-+-+-+-+-+-+-+-+-+-+-+-+-+-+-+-+-+-+-+-+-+-+-+-+-+-+-+-+-+-+
//              Media Adaptation Resource Session ID            //
+-+-+-+-+-+-+-+-+-+-+-+-+-+-+-+-+-+-+-+-+-+-+-+-+-+-+-+-+-+-+-+-+
//              Media Adaptation E2E Session Footprint          //
+-+-+-+-+-+-+-+-+-+-+-+-+-+-+-+-+-+-+-+-+-+-+-+-+-+-+-+-+-+-+-+-+
//               Failed Media Adaptation Description            //
+-+-+-+-+-+-+-+-+-+-+-+-+-+-+-+-+-+-+-+-+-+-+-+-+-+-+-+-+-+-+-+-+
//                  Error Code (reason of failure)              //
+-+-+-+-+-+-+-+-+-+-+-+-+-+-+-+-+-+-+-+-+-+-+-+-+-+-+-+-+-+-+-+-+
//             Proposed New Media Adaptation Description        //
+-+-+-+-+-+-+-+-+-+-+-+-+-+-+-+-+-+-+-+-+-+-+-+-+-+-+-+-+-+-+-+-+
```

Message Processing at NSIS-routers

Optionally, signaling messages of the NSIS media format adaptation-NSLP proposed above may only be processed at NSIS routers after an authentication procedures have been successfully accomplished (typically a POLICY_DATA object is carried in messages).

Processing a QUERY Message

A QUERY message containing a Media Adaptation Desired object is analyzed by each NSIS router through which the query is passed. Each media adaptation processing requested and its associated parameters are analyzed. If the requested processing contained in the Media Adaptation Description of parameter with ID=1 is available, then a Media Adaptation Available object is included in the QUERY message by the respective NSIS router, which includes a parameter (ID=5) reflecting the capabilities, definitions, configurations and information of the media adaptation processing. The parameters included in the Media Adaptation Available and the Media Adaptation Desired objects are linked through the MAID. Several parameters containing the same MAID represent different alternative NSIS routers offering equivalent or similar capabilities.

The querying terminal of the reservation may opt for one or the other available processing, The terminal's decision which media adaption resource to utilize if there are alternatives available may for example depend on the number of hops to a respective one of the available resources, on the cost involved for utilizing a respective resource (for example latency) or on other metrics. Detailed information on the available media adaptation resource may be necessary, since transcoders (and in general any adaptation) may change some attributes in the packet payload such as the RTP payload type. For example, if there are two adaptation processing steps required for a conversion from format X to Y (X→Y'→Y"→Y) then Y' and Y" need to include the available payload type range in the description, so that the reservation includes the exact input and output payload type numbers for the "a=" lines in each media stream ("m=" line). The exact specification of the processing capabilities is important to the extend to be able to associate a reservation state to a media stream. The exact specification of the processing capabilities may further allow reserving a granted resource later, in case the sender of the reservation message request to.

If no resources may be reserved by the requesting terminal or the requested media adaptation processing is not supported, then the message is forwarded without changes to the next on-path NSIS-router as determined by the NTLP routing.

Processing a RESERVE Message

A reserve message is processed as a query message. In contrast to the query message, the reserve message actually reserves Media Adaptation resources for each MAID. Additionally, in reserve messages, the Media Adaptation Descriptions in parameters with ID=4 do not contain any value ranges, but only fixed values as for the resource reservation should be explicit. At each NSIS router, one input and one output parameter has to be instantiated for each media adaptation processing. In the reserve message, each parameter of a Media Adaptation Desired object with Parameter ID=4 indicating media adaptation processing to be reserved is removed once it is processed, since the reserve message contained a set of ordered Media Adaptation steps.

The parameter sets across the media adaptation reservations in subsequent NSIS routers are matched, so that e.g. output payload type of the conversion to format Y' and input payload type for the conversion to format Y" take the same value. This matching is confirmed (or denied) with the RESPONSE message that conveys the settings of the subsequent reservation (Parameter IDs 5 or 6).

Processing a RESPONSE Message

The response message has two main uses:
conveying information on available media adaptation resources back to the initiator when acting as response to QUERY messages and
confirming the success of the reservation in subsequent NSIS-routers when acting as response to RESERVE messages, Media Adaptation Capability Search As mentioned previously, two possibilities for searching media adaptation capabilities in the overlay network are possible:
on-path search—This search option utilizes the on-path option for NSIS signaling to detect NSIS routers on the media data path providing the desired media adaptation capabilities. Each NSIS router on the media data path receiving the query message inspects the Media Adaptation Desired objects and Media Adaptation Available objects and modifies them according to their availability. The drawback of this simplistic approach is that the probability of encountering all resources on the media data path to the peer might be very low.
off-path search (proximity search)—According to this search option each NSIS router queries also adjacent "neighboring" NSIS routers, not on the media data path, for their capabilities.

On-Path Search

The on-path search has already been discussed above and its message flow has been also is similar to the one shown in FIG. 5. The querying terminal sends a query message along the media data path to the peer terminal to establish the session with. The NSIS routers on-path process the query and add a description their media adaptation capabilities to the query, if matching the query. The descriptions are then provided back to the querying terminal, which selects the NSIS routers that fulfill the media adaptation requirements of the query and reserves resources at the selected NSIS routers.

Proximity Search

In case of an off-path search different implementations are presented present in the following.

Basic Operation Modus—Pull Operation

In the basic operation modus, the behavior for Proximity Search is to check the available capabilities of "neighboring" NSIS routers to the NSIS routers on-path. A neighboring NSIS Entity (NE) or NSIS router is defined as an NSIS entity that is one or more hops away from the NSIS router currently processing the NSIS message. In standard NTLP protocol, like e.g. in GIMPS, each NE is aware of the other NEs that are one hop away, so-called adjacent GIMPS nodes. This mechanism for GIMPS routing state maintenance is described in the GIMPS peer discovery mechanisms in the IETF internet draft "GIMPS: General Internet Messaging Protocol for Signaling" already mentioned above.

For Proximity Search of the new proposed NSIS media format adaptation-NSLP in the basic modus, the operation works according to a "pull" model, i.e. NSIS routers (or NEs) retrieve information from neighbor NSIS routers on demand.

According to an embodiment of the invention this mechanism may be implemented as follows:
Local processing of QUERY messages: each visited NSIS router includes a capability description (parameter with ID=5) into the Media Adaptation Available object, if the query is matched and the NSIS router is willing to allocate resources.
Each on-path NSIS router, upon receiving a QUERY message in which the parameter "Hop distance to explore" in the Control Information object is different from zero, forwards the message to adjacent NSIS routers not on the media data path (off-path).
Moreover, each off-path NSIS router through which the QUERY message is passed reduces the "Decreasing count of hops" in one unit when forwarding the message.
Each off-path NSIS router that receives the QUERY message forwards the QUERY on its interfaces, except for the interface on which the QUERY message has been received.
Each NSIS router that has queried off-path NSIS routers waits until a RESPONSE message containing the available media adaptation capabilities arrives for each QUERY message before forwarding the QUERY message further to an on-path NSIS router.
Upon arrival of a RESPONSE message from the next adjacent NSIS router off-path, the off-path NSIS router compiles all parameters in the Media Adaptation Available object in one RESPONSE message.
Each on-path NSIS router that receives this compiled RESPONSE message extracts the Media Adaptation Available object, includes it in the QUERY message and forwards the "updated" QUERY message towards next NSIS router located on the media data on-path.

Eventually, a RESPONSE message with all capabilities available of on-path and off-path routers of the given "hop distance to explore" arrives at the initiator of the search.

Note that in this basic algorithm loops in the propagation path of the QUERY message are not avoided, but the loops may not be harmful since the RESPONSE message is triggered—thereby ending the propagation of QUERY message—when the counter reaches the zero value or no other NSIS router is attached.

Figure 10:
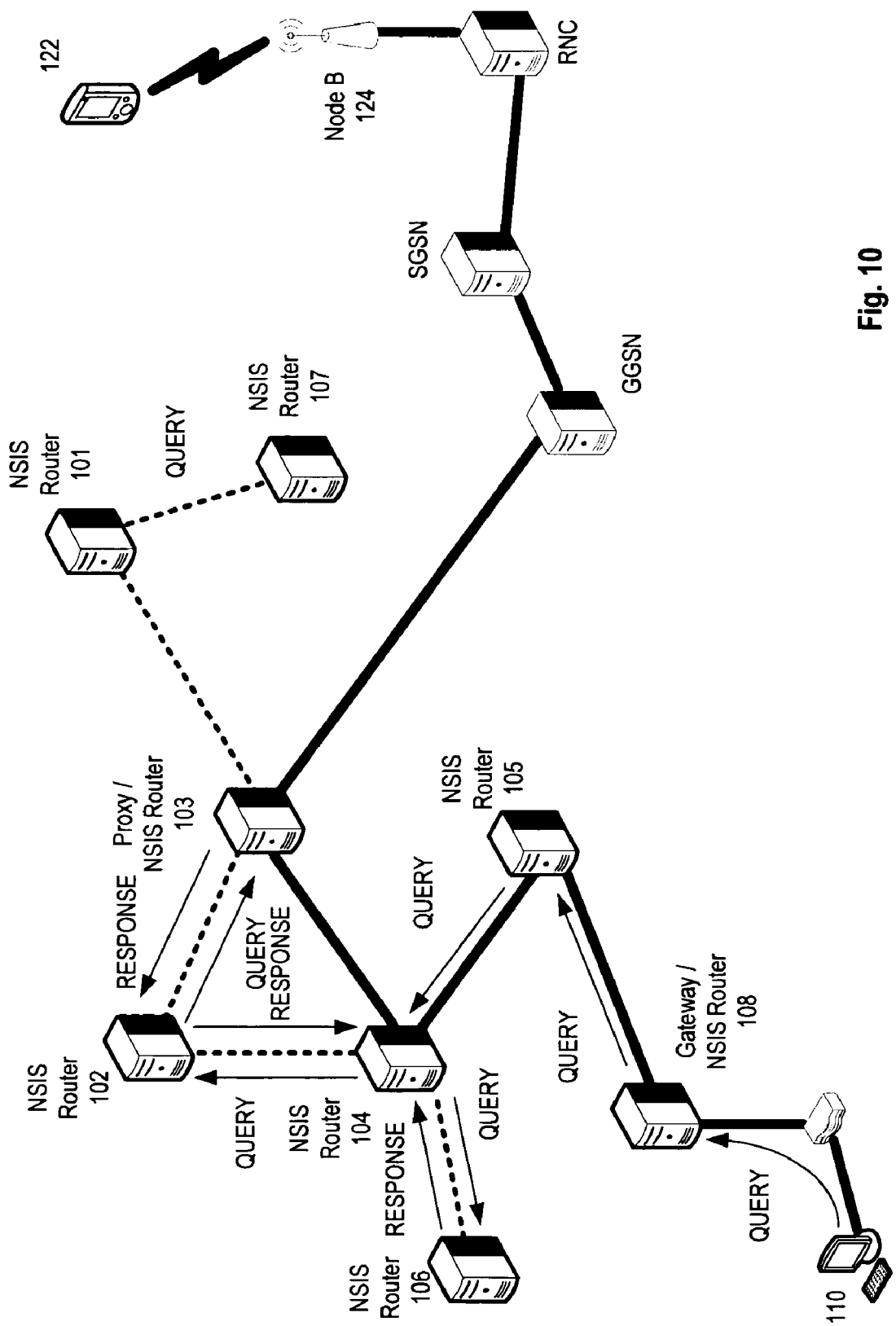
FIG. 10 to 14 show the exchange of messages of the off-path NSIS router detection mechanism according to another embodiment of the invention through the overlay network of FIG. 2 between two terminals.
Figure 11:
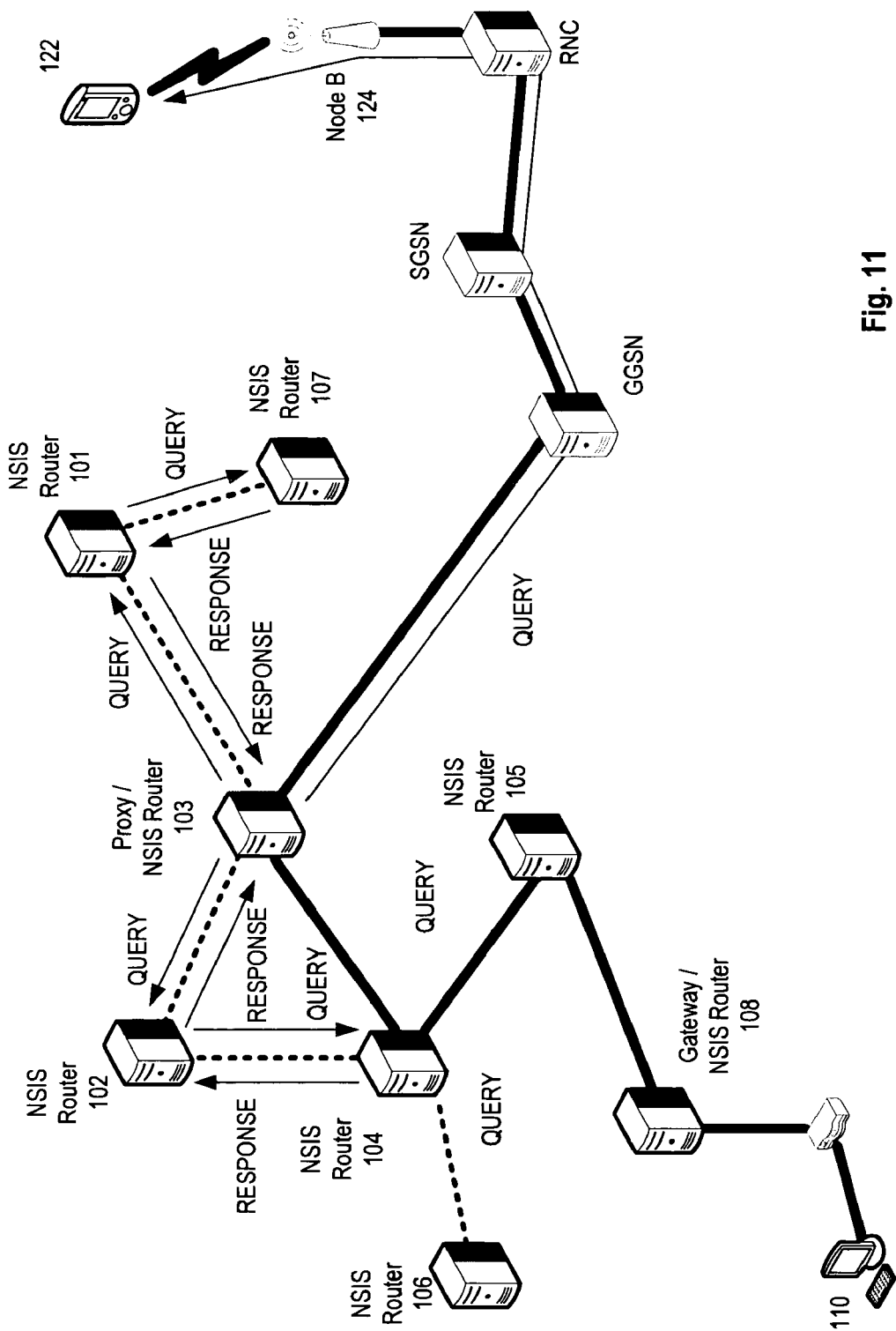
Figure 12:
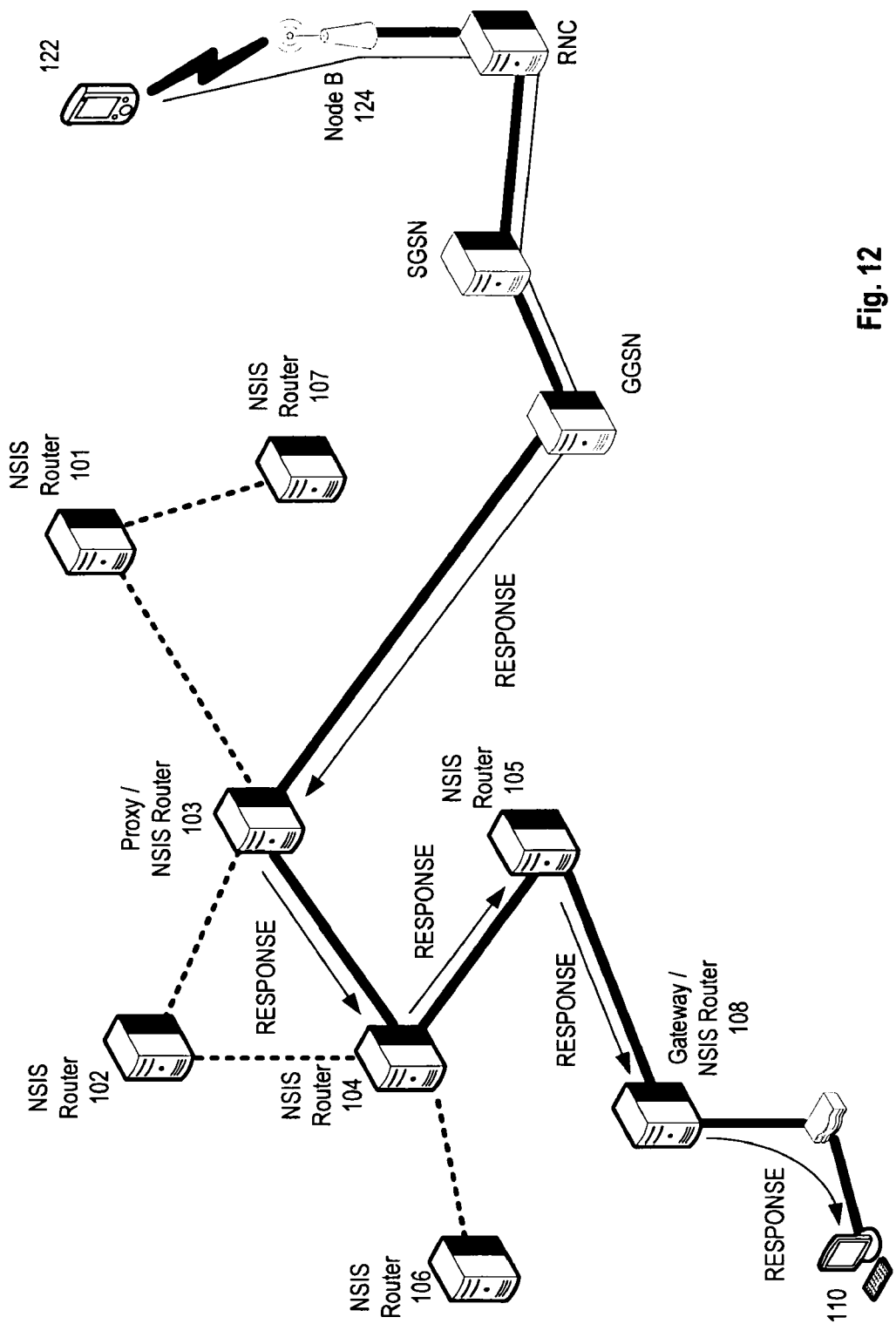

This operation of forwarding the query message and receiving a response message thereto according to an illustrative embodiment of the invention is shown in FIGS. 10 to 12 assuming that a session is to be established between terminals 110 and 122. The detection of the media adaptation resources in the packet switched network is shown for the media path from terminal 110 to terminal 122. In FIG. 10, The SIP user agent of terminal 110 interfaces to the proxy 108 and causes same to initiate a proximity search for media adaption resources not more than two hops away from the default media path (Hop distance to explore field set to the value 2) from terminal 110 to terminal 122 indicated by the bold line connecting the respective network nodes.

As proxy/NSIS router 108 has only one adjacent NSIS router 105 on-path, proxy/NSIS router 108 adds, if the query is matched and the NSIS router is willing to allocate resources, a description of its media adaptation capabilities to the query message (e.g. adds a Media Adaptation Available object) and forwards the "updated" query message to NSIS router 105. NSIS router 105 has also no adjacent off-path neighbors, so it also adds a description of its media adaptation capabilities to the query message and forwards the query message to the next on-path NSIS router 104.

NSIS router 104 has two off-route neighbors, namely NSIS routers 106 and 102. Before further passing the query message to the next on-path NIS router 103, NSIS router 104 query its off-path neighboring NSIS routers 106 and 102 and awaits their response message to the query. NSIS router 102 checks the hop counter (in the Hop distance to explore field) and decreases the value from 2 to 1. As the counter value is not 0, NSIS router 102 forwards the query message to its neighboring NSIS router(s), which is only NSIS router 103. NSIS router 103 detects that the hop counter after decreasing equals 0 and thus, the query message needs not to be propagated further. NSIS router 102 awaits the response message from NSIS router 103, evaluates same and aggregates the information therein to form a response message to NSIS router 104.

NSIS router 104 evaluates the response messages received from NSIS routers 102 and 106. In case NSIS router 103 has added a description of its media adaptation capabilities, NSIS router 104 may detect a loop in the overlay network due to the information in the response message received from NSIS router 102 and its knowledge that NSIS router 103 is the next on-path NSIS enabled node. Further, NSIS router 104 analyzes the media adaptation capabilities in the response messages received and updates the query message accordingly also considering its media adaptation capabilities. Then, it forwards the updated query message to the next NSIS router 103 on the media data path (not shown).

Turning now to FIG. 11 the operation of NSIS router 103 is only briefly explained, since the operation is essentially similar to the one of NSIS router 104. Also NSIS router 103 detects that a proximity search is performed and therefore forwards the query message to NSIS routers 101 and 102 first. NSIS routers 101 and 102 reduce the hop counter from 2 to 1 and before generating a response message to the query message forward the updated query message further to NSIS routers 104 and 107 that both return a response message. Upon reception of these response messages at NSIS routers 101 and 102 respectively, same aggregate the information therein and the knowledge of their own respective media adaptation capabilities to a response message sent back to NSIS router 103. NSIS router 103 also evaluates the response messages from NSIS routers 101 and 102 and aggregates the information to an updated query message that is subsequently transmitted to the—in this example—NSIS media format adaptation-NSLP enabled terminal 122. As illustrated in FIG. 12, terminal 122 extracts the information on the media adaptation capabilities detected and indicated in the query message and provides the information back to terminal 110 in a response message on a hop-by-hop basis.

Basic Operation—Utilizing Off-Path Media Adaptation Resources

As has been already described above, in case a deviation from the default media data path is required—e.g. due to a requested media adaptation resource does not lie available on the media data path—the Network ID may be used to establish tunnels to those NSIS-routers that administer those resources.

When a NSIS router detects that the media adaptation resource to be reserved is not hosted by it—e.g. the Network ID is different from the own—it may establish a tunnel to that NSIS router off-path and request processing there using the Media Adaptation Resource ID and the Media Adaptation Session ID. If for example some media adaptation resources are located far from the closest on-path NSIS routers, there are generally two options how to utilize the media adaptation resources of the NSIS router off the default media data path: either the media data path is changed to incorporate also the originally off-path NSIS router of which the media adaptation resources need to be utilized or at least one tunnel may be established from one or more NSIS routers on the default media data path in order to utilize the off-path NSIS router's capabilities. Using the later option the default media data path may not need to be changed.

Figure 13:
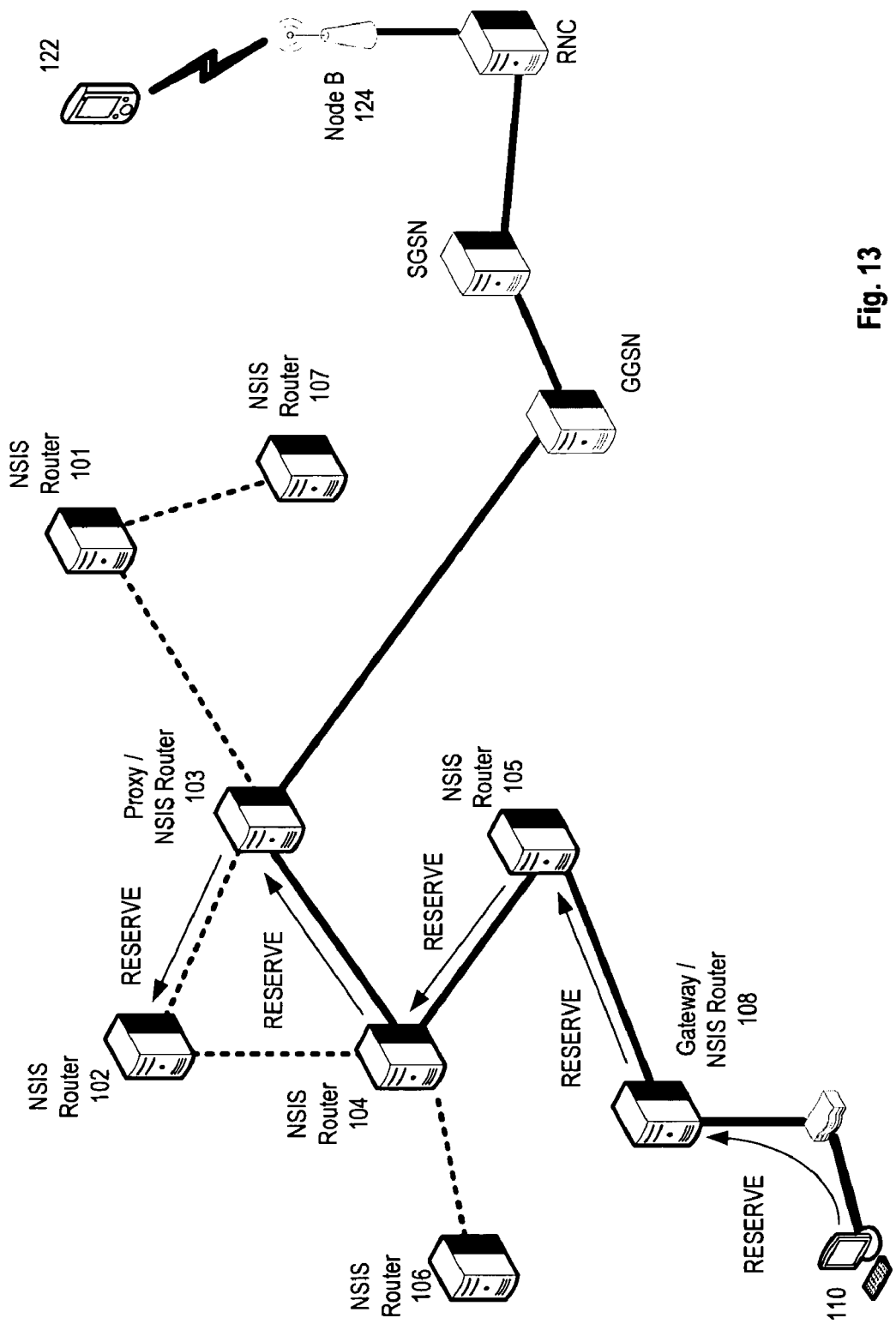
Figure 14:
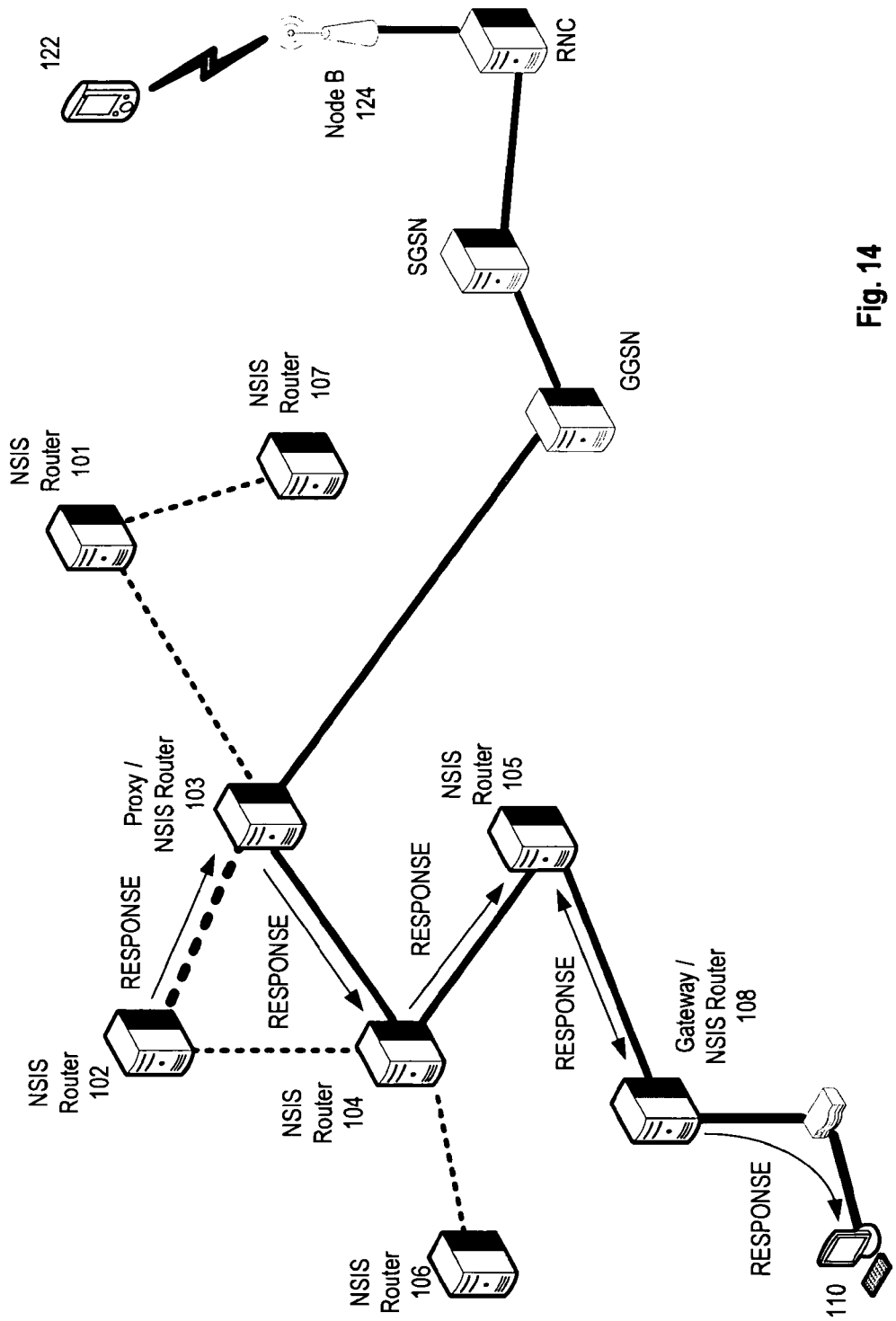

Turning to FIG. 13, an exemplary reservation of a media adaptation resource at NSIS router 102 is shown. As explained with respect to FIGS. 10 to 12 above, the terminal 110 has received a response message describing the media adaptation resources that may be used on-path and off-path. Assuming that only NSIS router 102 may provide the media adaptation required for the session with terminal 122, terminal 110 tries to reserve media adaptation resources on NSIS router 102. Therefore, terminal 122 initiates the transmission of a reserve message to NSIS router 102. As the reserve message is processed in intermediate NSIS router 103, same forwards the reserve message to NSIS router 102 and detects that the media adaptation resource to be utilized is off the default media path. According to this exemplary embodiment, NSIS router 103 therefore sets up a tunnel between itself and NSIS router 102. Upon receiving the media data stream to be adapted during the session, NSIS router 103 filters the streams and passed the media data thereof to NSIS router 102 for conversion through the establish tunnel. The NSIS router 102 returns the converted media stream which is then forwarded along the media path toward terminal 122

In order to be able to include resources off-path in the reservation using tunneling, the NSIS routers need to implement tunneling capabilities and may further implement two additional parameters below for recording routes and requesting tunnel reservations.

The terminal initiating the reservation (e.g. terminal 110 or 122) builds a "network graph" around the routing path between itself and the destination terminal. Hence, the terminal knows, the topology of the overlay network formed by NSIS routers to the extent it has previously explored the network by its query message (Hop distance to explore field). Thus, it has also knowledge of the distances (measured in hops) to each of the NSIS routers on-path and off-path in the network topology.

In order to find out the topology around the path it is proposed according to an embodiment of the invention to further enhance the semantics of NSLP: besides querying for the needed media adaptation, at least the Network ID of all NSIS routers—both on-path and off-path—that have received a query message are recorded regardless whether they match the queried media adaptation capabilities or not.

Thus, a new parameter may be included in a query message—e.g. inside the Media Adaptation Desired object specified above, which triggers the inclusion of network IDs of those NSIS routers having received the query message in a response message. Consequently, also further parameter conveying the network ID(s) is provided in the response message—e.g. inside the Media Adaptation Available object specified above.

For the query message, the new parameter (e.g. with ID=7) may have the exemplary following format:

The "Record Route" field includes the Network IDs of the visited nodes in the search direction, wherein the most recent NSIS router that processed the message adds its network ID e.g. to the end of the list. By correlating the set of routes and the number of hops to the terminal initiating the query message, the terminal can build a network topology of the queried network nodes. Optionally, this network topology may be enhanced with QoS metrics (instead of just the number of hops) like bandwidth or delay, which may be used by the terminal to select a media adaptation resource offering the necessary media conversion and also the best overall QoS performance.

Once the network topology is known, the terminal may assert the tunnel endpoints for the necessary tunnel(s) to the off-path NSIS router(s) providing the desired media adaptation capabilities. As described above, tunneling is used to "include" the off-path nodes in a media adaptation path.

To indicate the tunnel(s) to be establish for including the off-path NSIS router, a new parameter is added to the reserve messages. The parameter describes the tunneling to establish and the required adaptation in cascaded and ordered form.

Returning to the example shown in FIG. 13, NSIS router 102 is located outside the default media data path (marked by bold solid line) but provides the required media adaptation capabilities. To include NSIS router 102 (Tunnel Destination/Source A'), a triangular routing may be desired: NSIS router 104→NSIS router 102→NSIS router 103, so that media data is taken off the path between NSIS router 104 and incorporated again onto the path in NSIS router 103. For this purpose, two tunnels (from NSIS router 104→NSIS router 102 and from NSIS router 102→NSIS router 103) have to be established.

The reserve message thus comprises a media format adaptation description (parameter ID=4) for NSIS router 102 indicating the necessary media format adaptation (collect in a

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Object ID = 1  | Parameter ID = 7 |  Length (bytes)  |   MAID = 0   |
+-+-+-+-+-+-+-+-+-+-+-+-+-+-+-+-+-+-+-+-+-+-+-+-+-+-+-+-+-+-+-+-+
```

The MAID set to 0 indicates to the NSIS routers processing the query message that no Media Adaptation Description is included in the message. Each NSIS router receiving this parameter in the query message includes the following exemplary parameter (e.g. with ID=8) in the Media Adaptation Available object:

previous query, as usual) and a description of the tunnel(s) to establish. For example, a new parameter with ID=9 may be defined describing the tunnel(s) to establish among NSIS routers 104, 102 and 103 (respectively) and comprising the media format adaptation description (parameter ID=4) at NSIS router 102:

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|  Object ID = 2  | Parameter ID = 8 |  Length (bytes)  |   MAID = 1   |
+-+-+-+-+-+-+-+-+-+-+-+-+-+-+-+-+-+-+-+-+-+-+-+-+-+-+-+-+-+-+-+-+
|     Nr hops     |     Nr hops     |                                  |
|    to source    |  away from path |            reserved              |
+-+-+-+-+-+-+-+-+-+-+-+-+-+-+-+-+-+-+-+-+-+-+-+-+-+-+-+-+-+-+-+-+
//                        Network ID                               //
+-+-+-+-+-+-+-+-+-+-+-+-+-+-+-+-+-+-+-+-+-+-+-+-+-+-+-+-+-+-+-+-+
//                        Record Route                             //
+-+-+-+-+-+-+-+-+-+-+-+-+-+-+-+-+-+-+-+-+-+-+-+-+-+-+-+-+-+-+-+-+
```

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|   Object ID = 3   | Parameter ID = 9  |   Length (bytes)  |    RESERVED    |
+-+-+-+-+-+-+-+-+-+-+-+-+-+-+-+-+-+-+-+-+-+-+-+-+-+-+-+-+-+-+-+-+
//        Network ID of 1st Tunnel Source = NSIS router 104)         //
+-+-+-+-+-+-+-+-+-+-+-+-+-+-+-+-+-+-+-+-+-+-+-+-+-+-+-+-+-+-+-+-+
//        Network ID of 1st Tunnel Destination = NSIS router 102     //
+-+-+-+-+-+-+-+-+-+-+-+-+-+-+-+-+-+-+-+-+-+-+-+-+-+-+-+-+-+-+-+-+
# #     media format adaptation description (parameter ID = 4) for   # #
# #           the necessary Media Adaptation to be reserved at A'    # #
+-+-+-+-+-+-+-+-+-+-+-+-+-+-+-+-+-+-+-+-+-+-+-+-+-+-+-+-+-+-+-+-+
|   Object ID = 3   | Parameter ID = 8  |   Length (bytes)  |    RESERVED    |
+-+-+-+-+-+-+-+-+-+-+-+-+-+-+-+-+-+-+-+-+-+-+-+-+-+-+-+-+-+-+-+-+
//        Network ID of 2nd Tunnel Source = NSIS router 102)         //
+-+-+-+-+-+-+-+-+-+-+-+-+-+-+-+-+-+-+-+-+-+-+-+-+-+-+-+-+-+-+-+-+
//        Network ID of 2nd Tunnel Destination = NSIS router 103     //
+-+-+-+-+-+-+-+-+-+-+-+-+-+-+-+-+-+-+-+-+-+-+-+-+-+-+-+-+-+-+-+-+
```

Optionally, the tunneling could be established from NSIS router 103 to NSIS router 102 and from NSIS router 102 back to NSIS router 103, similarly after appropriately adapting the media format as desired. This would change the Tunnel Destination and Tunnel Source of the first and second tunnels to be the same, namely NSIS router 102. Optionally, several off-path NSIS-routers could be included in cascaded form in the payload of the reverse message.

Enhanced Operation—Push Operation

Another approach for detecting and reserving off-path media adaptation resources suggested in a further embodiment of the invention is described in this section. According to the embodiment, the NSIS routers in the overly network maintain a local database of adjacent NSIS routers as well as of NSIS router more than one hop away. the generation of the database content at the NSIS router may be based on a so-called "push" communication model, in which NSIS routers subscribe to other NSIS routers and are informed on the capabilities of the NSIS router at which they subscribe. This operation is somewhat similar to the vector routing algorithms like described in RFC 1058, "Routing Information Protocol" by Hedrick (available at http://www.ietf.org) according to which each node sends its known routes to the neighbors and a global routing vector (in this case a global map of NSIS routers and their capabilities) is obtained after some period of time, the so-called convergence time.

The mechanism proposed according to this embodiment of the invention works as follows: After discovering the set of peer NSIS routers that support the NSIS media format adaptation-NSLP described herein, each NSIS-router decides whether to subscribe for receiving periodic updates of each NSIS router's capabilities and current resource status (e.g. load, available storing capacity, etc.). The subscription may be achieved by sending a subscribe message to the respective NSIS router. A subscribe message may have essentially the same structure as a query message, and triggers periodic responses in the form of notify messages from the NSIS routers receiving the subscription message.

The notify messages are sent periodically by the NSIS routers and reflect their capabilities and optionally other parameters, such as current load characteristics, available CPU power or storage capacity. The notify messages allow the NSIS routers to collect information on the available media adaptation resources and optionally QoS resources at other NSIS routers and maintain this information in a local database. The type and quantity of information maintained in the local database may strongly depend on the notification period: if the "refresh" time is long, it may be of no use to store rapidly changing information that would be expired until the next "refresh", like storage capacity or available CPU power.

At some point in time, after the "convergence time", each NSIS router has a list of available NSIS routers in that network and their capacities available. When a media format adaptation-NSLP query message is received by an NSIS router on the media data path, the NSIS router does not need to forward the query off-path to explore media adaptation capabilities, but may now consult its database and is thereby immediately aware of available media adaptation resources at the neighboring NSIS routers and beyond.

The following represents a set of capabilities and identifiers that the notification messages may include:

```
+-+-+-+-+-+-+-+-+-+-+-+-+-+-+-+-+-+-+-+-+-+-+-+-+-+-+-+-+-+-+-+-+
//                        Network ID                              //
+-+-+-+-+-+-+-+-+-+-+-+-+-+-+-+-+-+-+-+-+-+-+-+-+-+-+-+-+-+-+-+-+
//                   Media Adaptation Resource ID                 //
+-+-+-+-+-+-+-+-+-+-+-+-+-+-+-+-+-+-+-+-+-+-+-+-+-+-+-+-+-+-+-+-+
//                  Media Adaptation Resource Cost                //
+-+-+-+-+-+-+-+-+-+-+-+-+-+-+-+-+-+-+-+-+-+-+-+-+-+-+-+-+-+-+-+-+
//                   Media Adaptation Description                 //
+-+-+-+-+-+-+-+-+-+-+-+-+-+-+-+-+-+-+-+-+-+-+-+-+-+-+-+-+-+-+-+-+
```

Note that neither the Media Adaptation Session ID nor the Footprint needs to be included. This is because these are only instantiated upon reception of a query message, which reflects the intention of reservation.

Combination of Media Adaptation Processing Detection and Reservation and QoS Detection and Reservation Similar mechanisms as described above, may also be used to query (detect) and reserve network QoS resources, if required. The available QoS that can be provided by the NSIS routers on the media data path between terminal 110 and terminal 122 may be for example queried extending the query message above by adding an QoS Desired object which is essentially similar in its structure to the Media Adaptation Desired object and contains a description of QoS constraints that should be met. The NSIS nodes processing the query may each add or update a QoS Available object(s) having essentially the same function as the Media Adaptation Available object and specifying the capabilities of either each NSIS router along the media path or the overall minimum QoS that can be provided, wherein QoS Available object(s) added to the query is propagated back to the querying terminal 110. Terminal 110 may select the adequate QoS and media adaptation resources at (a) NSIS router(s) and requests the reservation of QoS resources along the media data path and the reservation of media adaptation processing at the selected NSIS routers. Both reservations may be combined in an extended reserve message, which comprises an exact specification of QoS constraints to be reserved in the on-path NSIS routers in addition to the description of the media adaptation resources to reserve.

After all media adaptation have been removed from Media Adaptation objects, a reserve message may be returned to terminal of the reservation since no further processing is required.

Accordingly, in order to reserve media adaptation resources and/or QoS resources on the path from terminal 122 to terminal 110 the same procedures as outlined in the previous sections may be used.

General Issues and Variants

One of the main benefits of the proposed implementation of the different mechanism and messages may be that it depends on the underlying routing (OSPF, RIP, ... ) which implies that the changes required on existing infrastructures is minimum. Because of this dependence, however, it may be desirable that the protocol headers, as detected by the NTLP and reflected in the MRI (cf., GIMPS draft) affecting routing should not be modified, which makes it difficult to assert for the receiver, which network nodes have modified the data.

A solution for this implication proposed by a further embodiment of the invention is the reuse of the principles of RTP mixers and translators, the use of the Synchronization Source identifier (SSRC) or the Contributing SSRC (CSRC) included by intermediate RTP mixers and translators adapting the packets. This SSRC or an alternative identifier may be linked to the Media Adaptation Session ID and this relation may be made known to the endpoint agreeing upon the media adaptation, e.g. by using the proposed "a=intermediate:" attribute in the session description.

A further improvement of the mechanisms described herein relates to the order in which media adaptation resources may need to be used and their location on the media data path. It may happen that all media adaptation resources lie on-path, but have to be visited several times in different order to obtain the required media conversion. Also some conversions may require, that the media data needs to passed forth and back the media data path for adaptation (e.g. terminal 110→NSIS router 108→NSIS router 05→NSIS router 104→NSIS router 103 (adaptation)→NSIS router 104 (adaptation)→NSIS router 103→terminal 122). This problem may also circumvented by establishing tunnels that ensure the correct order of using the necessary media adaptation resources, using the same tunneling mechanisms used for including media adaptation resources that lie off-path.

Further, the examples described so far have been mainly based on the use of SIP as a session initiation and management protocol. For example, when media streaming is concerned a similar scenario can be assumed for RTSP messages. Similarly to SIP, RTSP is a protocol with HTTP-like syntax that may also use SDP (or other session description protocol) to convey the session details and capabilities of end-hosts. Unlike SIP, RTSP fulfils the functionality of "remote controlling" multimedia presentations.

In the embodiments described so far, a central entity (the initiator of the reservation) includes the exact processing required in form of media adaptation descriptions in the payload of the MediaSpec messages specified herein. The logic for deciding the media adaptation steps required is therefore centralized. Alternatively, according to another embodiment of the invention distributed approach is possible. In this variant, a NSIS router would be allowed to decompose the required media adaptation processing in several steps, e.g. transcoding of codec X to codec Y in two steps: first transcode to X' and then to Y. This decomposition would be necessary during a query request and may imply the definition of a new parameter splits a give media adaptation description (identified by a given ID) into several intermediate descriptions that are fed back to the query initiator. Besides intermediate transcoding, other processes may require such behavior, such as splitting the flows into separate media (like audio and video).

Some embodiments have assumed that the routing of a flow remains unchanged for the duration of a session. There may however be cases, where routing changes due to, e.g. policy or administrative decisions or because of the traffic engineering practices in place. In those cases it may be useful to make "backup reservations", meaning the reservation of additional resources with a lower availability percentage, to cater for those cases where routing changes. A change of route may be detected at either the NSIS routers before or after the route change or at the endpoints, by analyzing the E2E Session Footprints.

Further it is noted that the invention may also be employed in multicast media sessions. For example, the NSIS router 103 may be a proxy for the mobile terminals 116 to 123 attached to it through the mobile communications system. In order to establish a multicast service the proxy 103 may handle session set-up and control on behalf of the participating mobile terminals in the mobile communications network. The proxy 103 may be aware or may be made aware of the mobile terminals' media capabilities, e.g. in terms of supported media format. Thus, in case a multicast session is to be established, the proxy 103 is aware of or may be made aware of a lack of support of media formats specified in the session description. The proxy 103 may form groups of mobile terminals that do not support a media format suggested in the session description and may detect and reserve media adaptation resources in the network group-wise as described herein.

Another embodiment of the invention relates to the implementation of the above described embodiments using hardware and software. It is recognized that the embodiments of the invention above may be implemented or performed using computing devices (processors), as for example general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It is to be recognized that the different embodiments and variations thereof as described in the foregoing are merely intended as illustrative examples. It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

The invention claimed is:

1. A method for establishing a media session comprising at least one media stream between a first terminal and a second terminal through a packet switched communications network, wherein the at least one media stream is communicated using a media transport protocol, the method comprising the following steps performed by the first terminal:
   transmitting a set-up message to the second terminal using a session management protocol to initiate the session, wherein the message comprises a session description suggesting a media format and corresponding parameters and attributes for each media stream to be communicated in the media session,
   receiving a response to the set-up message using the session management protocol, wherein the response to the set-up message comprises a amended session description, wherein the amended session description suggest an alternative media format for at least one media stream of the media session for which a media format not supported by the second terminal has been suggested in the session description comprised in the set-up message,
   for each alternative media format in the session description comprised in the response to the set-up message, determining if a respective alternative media format is supported by the first terminal,
   if not, detecting for each alternative media format not supported by the first terminal at least one NSIS router using the Next Step In Signaling (NSIS) framework, wherein a detected NSIS router is capable of converting the packet data of a media stream from the media format suggested by the first terminal in the session description in the set-up message into the respective alternative media format suggested by the second terminal in the session description of the response in the set-up message,
   if at least one NSIS router has been detected for each alternative media format not supported by the first terminal, reserving resources for converting packet data in the suggested media format into the respective alternative media format at least one NSIS router detected for a respective alternative media format not supported by the first terminal, and
   starting the media session, upon having successfully reserved the resources for media format conversion, wherein the packet data of the at least one media stream of the media session is provided using the media transport protocol from the first terminal to the second terminal through the at least one NSIS router on which resources for media format conversion have been reserved for each alternative media format not supported by the first terminal.

2. The method according to claim 1, wherein detecting at least one NSIS router using the NSIS signaling framework comprises:
   transmitting a query message using a NSIS Transport Level Protocol (NTLP) along the path of packet data of the at least one stream of the media session from the first terminal to the second terminal through the packet switched network, wherein the query message queries each NSIS router receiving the query message for a capability to convert packet data of a stream of the media session from a suggested media format not supported by the first terminal to a respective alternative media format suggested by the second terminal in the session description in the response to the set-up message, and
   receiving in response to the query message a response message using NTLP indicating at least one NSIS router on the path of packet data from the first terminal to the second terminal capable of converting packet data of a stream of the media session from a suggested media format into the respective alternative media format.

3. The method according to claim 2, wherein the query message further queries each NSIS router receiving the query message for the capability to convert packet data of a media stream of the media session from a suggested media format not supported by the first terminal into an intermediate media format or from the intermediate media format into another intermediate media format or into the respective alternative media format for the respective media stream of the media session, and wherein the response message further indicates whether at least one NSIS router on the path from the first terminal to the second terminal is capable of converting packet data of a media stream of the media session from a suggested media format into an intermediate media format or from the intermediate media format into another intermediate media format or into the respective alternative media format.

4. The method according to claim 2, wherein reserving resources for converting packet data at a NSIS router comprises:
   transmitting a resource reservation request message to at least one NSIS router using NTLP requesting the reservation of media adaptation resources for converting the packet data of a stream of the media session from a suggested media format to an alternative media format suggested by the session description in the response to the set-up message by the second terminal, and
   receiving in response to the resource reservation request message a response message using NTLP indicating whether the NSIS router has reserved resources for the conversion.

5. The method according to claim 1, wherein the session description comprised the set-up message further indicates whether the first terminal is willing to perform media format conversion for at least media stream of the media session, if the second terminal does not support a suggested media format of a media stream in the session description.

6. The method according to claim 1, wherein the session description transmitted comprised in the set-up message further indicates to the second terminal and whether the reception of a respective media stream of the media session is mandatory for the establishment of the media session.

7. The method according to claim 6, wherein the session description transmitted comprised in the set-up message further indicates whether a conversion of a suggested media format for a media stream of the media session into another media format is optional or mandatory for the establishment of the media session, in case the second terminal does not support the suggested media format.

8. The method according to claim 1, wherein the amended session description further indicates whether the second terminal is willing to detect and reserve resources on at least one NSIS router media for converting packet data of a media stream in an alternative media format into packet data of the media stream in a suggested media format, if the suggested format for the respective media stream is not supported by the second terminal, and if so, the amended session description further indicates that the second terminal has started detection and reservation media format conversion resources upon transmitting the response to the set-up message.

9. The method according to claim 1, wherein the service descriptions transmitted and received by the first terminal further comprise quality of service constraints relating to the session, and wherein the amended session description in the response to the set-up message comprises suggests alternative quality of service constraints to the quality of service constraints comprised in the session description of the set-up message.

10. The method according to claim 9, further comprising:
   determining whether the alternative quality of service constraints are acceptable for the user of the first terminal, and
   if so, reserving resources along a path from the first terminal to the second terminal through the packet switched communications network according to alternative quality of service constraints indicated in the session description of the second terminal, wherein the packet data of the at least one media stream of the media session is passed from the first terminal to the second terminal along said path.

11. The method according to claim 1, further comprising aborting the session, if no NSIS router is detected for each alternative media format suggested in the session description received in the response to set-up message, if not sufficient resources for the converting media format at a respective NSIS router can be reserved, or if not sufficient resources along the path through the packet switched communications network can be reserved for fulfilling the alternative quality of service constraints suggested in the session description received in the response to set-up message.

12. The method according to claim 1, wherein starting the media session comprises transmitting an update message to the second terminal comprising an updated session description describing the media format conversion in an adaptation node for each respective stream of the media session for which an alternative media format has been suggested along a path from the first terminal to the second terminal through the packet switched communications network, wherein the packet data of the at least one media stream of the media session is passed from the first terminal to the second terminal along said path.

13. The method according claim 12, wherein the transmitted update message further comprises information on resources reserved by the first terminal along the path from the first terminal to the second terminal.

14. The method according to claim 12, further comprising receiving an update message from the second terminal comprising an updated session description describing the media format conversion in an adaptation node for each respective stream of the media session for which an alternative media format has been suggested along a path from the second terminal to the first terminal through the packet switched communications network, wherein the packet data of at least one media stream of the media session is passed from the second terminal to the first terminal along said path.

15. The method according claim 14, wherein the received update message further comprises information on resources reserved by the first terminal along the path from the second terminal to the first terminal.

16. The method according to claim 1, wherein the media transport protocol is the Real-time Transport Protocol (RTP).

17. The method according to claim 1, wherein the session description is provided in the Session Description Protocol (SDP) format or the Real-Time Streaming Protocol (RTSP) format.

18. The method according to claim 1, wherein the session management protocol is the Session Initiation Protocol (SIP), wherein the set-up message is an Invite message of the SIP protocol, and the response to the set-up message is a Session Progress message of the SIP protocol indicating to the first terminal that the second terminal acknowledges the willingness of the first terminal to detect and reserve media format conversion resources and that the second terminal has started to detect and reserve resources for media format conversion at least NSIS router for converting a media stream of the media session in an alternative media format not supported by the first terminal into a respective suggested media format supported by the first terminal, and the method farther comprises:
   if the alternative media format suggested in the session description comprised in the Session Progress message is not supported by the first terminal, transmitting a Provisional Response Acknowledgement message indicating to the second terminal that the first terminal has started to detect and reserve resources for media format conversion at a NSIS router for each alternative media format suggested in the session description, wherein an adaptation node detected and on which resources for media format conversion are reserved by the second terminal is configured to convert the packet data of a media stream of the media session from the alternative media format into the media format suggested by the first terminal, and
   receiving an provisional response acknowledgement.

19. A terminal for establishing a media session comprising at least one media stream between the terminal and a second terminal through a packet switched communications network, wherein the at least one media stream is communicated using a media transport protocol, the terminal comprising:
   a transmitter operable to transmit a set-up message to the second terminal using a session management protocol to initiate the session, wherein the message comprises a session description suggesting a media format and corresponding parameters and attributes for each media stream to be communicated in the media session,
   a receiver operable to receive a response to the set-up message using the session management protocol, wherein the response to the set-up message comprises a amended session description, wherein the amended session description suggest an alternative media format for at least one media stream of the media session for which a media format not supported by the second terminal has been suggested in the session description comprised in the set-up message,
   a processing unit operable to determine for each alternative media format in the session description comprised in the response to the set-up message if a respective alternative media format is supported by the terminal,
   the processing unit being configured to detect for each alternative media format not supported by the terminal at least one NSIS router using the Next Step In Signaling (NSIS) framework, if a respective alternative media format is not supported by the terminal, wherein a detected NSIS router is capable of converting the packet data of a media stream from the media format suggested by the first terminal in the session description in the set-up message into the respective alternative media format suggested by the second terminal in the session description of the response in the set-up message, a reservation unit operable to reserve resources for converting packet data in the suggested media format into the respective alternative media format at least one NSIS router detected for a respective alternative media format not supported by the first terminal, if at least one NSIS router has been detected for each alternative media format not supported by the first terminal, and wherein the terminal is adapted to start the media session upon having successfully reserved the resources for media format conversion, wherein the packet data of the at least one media stream of the media session is provided using the media transport protocol from the terminal to the second terminal through the at least one NSIS router on which resources for media format conversion have been reserved for each alternative media format not supported by the terminal.

20. A non-transitory computer readable medium storing instructions that, when executed by a processor of a terminal, causes the terminal to establish a media session comprising at least one media stream between the terminal and a second terminal through a packet switched communications network, wherein the at least one media stream is communicated using a media transport protocol, by:

transmitting a set-up message to the second terminal using a session management protocol to initiate the session, wherein the message comprises a session description suggesting a media format and corresponding parameters and attributes for each media stream to be communicated in the media session, receiving a response to the set-up message using the session management protocol, wherein the response to the set-up message comprises a amended session description, wherein the amended session description suggest an alternative media format for at least one media stream of the media session for which a media format not supported by the second terminal has been suggested in the session description comprised in the set-up message, for each alternative media format in the session description comprised in the response to the set-up message, determining if a respective alternative media format is supported by the first terminal, if not, detecting for each alternative media format not supported by the terminal at least one NSIS router using the Next Step In Signaling (NSIS) framework, wherein a detected NSIS router is capable of converting the packet data of a media stream from the media format suggested by the first terminal in the session description in the set-up message into the respective alternative media format suggested by the second terminal in the session description of the response in the set-up message, if at least one NSIS router has been detected for each alternative media format not supported by the first terminal, reserving resources for converting packet data in the suggested media format into the respective alternative media format at least one NSIS router detected for a respective alternative media format not supported by the first terminal, and upon having successfully reserved the resources for media format conversion starting the media session, wherein the packet data of the at least one media stream of the media session is provided using the media transport protocol from the first terminal to the second terminal through the at least one NSIS router on which resources for media format conversion have been reserved for each alternative media format not supported by the first terminal.

* * * * *